US010774198B2

(12) United States Patent
Baumann

(10) Patent No.: US 10,774,198 B2
(45) Date of Patent: Sep. 15, 2020

(54) ELECTROCHROMIC THERMOPLASTICS, DEVICES, AND COMPOSITES

(71) Applicant: Gentex Corporation, Zeeland, MI (US)

(72) Inventor: Kelvin L. Baumann, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 11 days.

(21) Appl. No.: 15/065,730

(22) Filed: Mar. 9, 2016

(65) Prior Publication Data

US 2016/0377946 A1    Dec. 29, 2016

Related U.S. Application Data

(60) Provisional application No. 62/184,704, filed on Jun. 25, 2015, provisional application No. 62/257,950, (Continued)

(51) Int. Cl.
*G02F 1/15* (2019.01)
*C08K 5/3465* (2006.01)
(Continued)

(52) U.S. Cl.
CPC .......... *C08K 5/3465* (2013.01); *C08K 5/3432* (2013.01); *C09K 9/02* (2013.01);
(Continued)

(58) Field of Classification Search
CPC .. G02F 1/15; G02F 1/1521; G02F 2001/1515; C08K 5/3432; C08K 5/3465; G02B 5/23; H01B 1/00; H01B 1/12
See application file for complete search history.

(56) References Cited

U.S. PATENT DOCUMENTS 4,297,401 A    10/1981    Chern et al.
4,418,102 A    11/1983    Ferrato
(Continued)

FOREIGN PATENT DOCUMENTS

CN    1571940         1/2005
JP    01-105916 A    4/1989
(Continued)

OTHER PUBLICATIONS

Benzyl Alcohol supplier distributor—CAS 100-51-6, Parcgem Company, (Year: 2018).*
(Continued)

*Primary Examiner* — Bijan Ahvazi
(74) *Attorney, Agent, or Firm* — Foley & Lardner LLP; Bradley D. Johnson

(57) ABSTRACT

An electrochromic thermoplastic composition includes about 10 wt % to about 60 wt % a poly(vinyl alcohol), a poly(acrylic acid), a poly(acrylic acid) salt, a polyaniline salt, a poly(diallyl dimethyl ammonium chloride), a poly (ethylene-co-acrylic acid), a co-polymer of any two or more thereof, or a mixture of any two or more thereof; about 40 wt % to about 90 wt % of a protic solvent; and at least one electroactive material; wherein the composition does not include lithium chloride, tetrabutylammonium bromide, lithium bis(trifluoromethanesulfonyl)imide, lithium triflate, and lithium hexafluorophosphate.

16 Claims, 4 Drawing Sheets

Related U.S. Application Data filed on Nov. 20, 2015, provisional application No. 62/258,051, filed on Nov. 20, 2015.

(51) Int. Cl.

| | | |
|---|---|---|
| *C08K 5/3432* | (2006.01) | |
| *C09K 9/02* | (2006.01) | |
| *G02F 1/1523* | (2019.01) | |
| *G02F 1/1516* | (2019.01) | |
| *G02F 1/1514* | (2019.01) | |

(52) U.S. Cl.
CPC .......... *G02F 1/1508* (2013.01); *G02F 1/1523* (2013.01); *C08K 2201/019* (2013.01); *G02F 1/15165* (2019.01); *G02F 2001/15145* (2019.01); *G02F 2001/164* (2019.01)

(56) References Cited

U.S. PATENT DOCUMENTS

| | | |
|---|---|---|
| 4,695,490 A | 9/1987 | McClelland et al. |
| 4,902,108 A | 2/1990 | Byker |
| 5,140,455 A | 8/1992 | Varaprasad et al. |
| 5,142,407 A | 8/1992 | Varaprasad et al. |
| 5,294,376 A | 3/1994 | Byker |
| 5,596,023 A | 1/1997 | Tsubota et al. |
| 5,596,024 A | 1/1997 | Horie et al. |
| 5,770,114 A | 6/1998 | Byker et al. |
| 5,818,625 A | 10/1998 | Forgette et al. |
| 5,888,431 A | 3/1999 | Tonar et al. |
| 5,910,854 A | 6/1999 | Varaprasad et al. |
| 5,940,201 A | 8/1999 | Ash et al. |
| 5,998,617 A * | 12/1999 | Srinivasa ............ C07D 213/22 544/347 |
| 6,020,987 A | 2/2000 | Baumann et al. |
| 6,057,956 A | 5/2000 | Ash et al. |
| 6,137,620 A | 10/2000 | Guarr et al. |
| 6,157,480 A | 12/2000 | Anderson et al. |
| 6,188,505 B1 | 2/2001 | Lomprey et al. |
| 6,193,379 B1 | 2/2001 | Tonar et al. |
| 6,193,912 B1 | 2/2001 | Thieste et al. |
| 6,249,369 B1 | 6/2001 | Theiste et al. |
| 6,268,950 B1 | 7/2001 | Ash et al. |
| 6,597,489 B1 | 7/2003 | Guarr et al. |
| 6,635,194 B2 | 10/2003 | Kloeppner et al. |
| 6,700,692 B2 | 3/2004 | Tonar et al. |
| 6,710,906 B2 | 3/2004 | Guarr et al. |
| 6,714,334 B2 | 3/2004 | Tonar |
| 7,256,925 B2 | 8/2007 | Noh et al. |
| 7,372,609 B2 | 5/2008 | Lin et al. |
| 7,372,611 B2 | 5/2008 | Tonar et al. |
| 7,428,091 B2 | 9/2008 | Baumann et al. |
| 7,830,583 B2 | 11/2010 | Neuman et al. |
| 8,228,590 B2 | 7/2012 | Baumann et al. |
| 8,323,534 B2 * | 12/2012 | Percec ................... C08L 29/14 252/500 |
| 8,368,992 B2 | 2/2013 | Neuman et al. |
| 8,559,093 B2 * | 10/2013 | Varaprasad ............ B32B 17/06 359/267 |
| 8,599,467 B2 | 12/2013 | Agrawal et al. |
| 8,928,966 B1 | 1/2015 | Kloeppner et al. |
| 9,658,508 B1 | 5/2017 | Bass |
| 2002/0015214 A1 | 2/2002 | Nishikitani et al. |
| 2002/0048678 A1 | 4/2002 | Hunia et al. |
| 2002/0141032 A1 | 10/2002 | Guarr et al. |
| 2002/0171081 A1 | 11/2002 | Vincent et al. |
| 2003/0039020 A1 | 2/2003 | Lomprey et al. |
| 2005/0162728 A1 | 7/2005 | Warner et al. |
| 2005/0231785 A1 * | 10/2005 | Oh .......................... B24B 37/04 359/265 |
| 2006/0077511 A1 | 4/2006 | Poll et al. |
| 2007/0206263 A1 | 9/2007 | Neuman et al. |
| 2008/0310007 A1 * | 12/2008 | Agrawal ................ B82Y 20/00 359/275 |
| 2011/0003070 A1 | 1/2011 | Pozo Gonzalo et al. |
| 2011/0147680 A1 | 6/2011 | Percec et al. |
| 2012/0032104 A1 | 2/2012 | Amb et al. |
| 2012/0154890 A1 * | 6/2012 | Jeon ....................... C09D 11/38 359/265 |
| 2013/0235323 A1 | 9/2013 | Sotzing et al. |

FOREIGN PATENT DOCUMENTS

| | | | |
|---|---|---|---|
| JP | 2001-188264 | * 7/2001 | ............... G02F 1/15 |
| JP | 2005-506567 A | 3/2005 | |
| JP | 2006/003888 | 1/2006 | |
| JP | 2009-529153 A | 8/2009 | |
| JP | 2010-250132 A | 11/2010 | |
| JP | 5181438 B2 | 4/2013 | |
| JP | 2013-200373 A | 10/2013 | |
| JP | 2014-072007 A | 4/2014 | |
| JP | 2015-022107 A | 2/2015 | |
| WO | WO-98/42796 A1 | 10/1998 | |
| WO | WO-99/02621 | 1/1999 | |
| WO | WO-2014/025348 A1 | 2/2014 | |
| WO | WO-2014/164257 A1 | 10/2014 | |

OTHER PUBLICATIONS

Giuseppe Chidichimo, Maurizio De Benedittis, Jessica Lanzo, Bruna Clara De Simone, Daniela Imbardelli, Bartolo Gabriele, Lucia Veltri, and Giuseppe Salerno, Solid Thermoplastic Laminable Electrochromic Film, Chem. Mater. 2007, 19, 353-358, © 2007 American Chemical Society. (Year: 2007).*

International Search Report and Written Opinion received in PCT/US2016/021619, dated Jun. 20, 2016 (32 pages).

International Search Report and Written Opinion received in PCT/US2016/021621, dated Jul. 6, 2016 (18 pages).

U.S. Office Action on U.S. Appl. No. 15/065,788 dated Feb. 27, 2017 (11 pages).

U.S. Office Action on U.S. Appl. No. 15/065,788 dated Mar. 21, 2017 (6 pages).

U.S. Office Action on U.S. Appl. No. 15/065,808 dated Jul. 19, 2017.

International Search Report and Written Opinion received in PCT/US2016/021630, dated Jan. 3, 2017 (22 pages).

Yang, Y. H. et al. Macromol, 2011, 44, 1450-1459.

Vollhardt, K.P.C., et al., Organic Chemistry: Structure and Function, 1999, 3rd Ed., Freeman and Company, New York, New York, NY.

U.S. Notice of Allowance on U.S. Appl. No. 15/065,808 dated Nov. 30, 2017.

International Preliminary Report on Patentability dated May 22, 2018, issued in PCT/US2016/021630.

Non-Final Office Action on U.S. Appl. No. 15/672,892 dated Jun. 28, 2018.

Office Action dated May 14, 2018 issued in Japanese Patent Application No. 2017-547953.

* cited by examiner

ELECTROCHROMIC THERMOPLASTICS, DEVICES, AND COMPOSITES

CROSS-REFERENCE TO RELATED APPLICATIONS

This application claims the benefit of U.S. Provisional Patent Application No. 62/184,704, filed on Jun. 25, 2015, 62/257,950, filed on Nov. 20, 2015; and 62/258,051, filed on Nov. 20, 2015, the entire disclosures of which are incorporated herein by reference for any and all purposes.

FIELD

The present technology relates generally to the field of electrochromic materials. More specifically, the present technology provides electrochromic thermoplastics with excellent clear and dark transmittance properties. The present technology also provides devices and composites incorporating the electrochromic thermoplastics.

SUMMARY

In one aspect, an electrochromic thermoplastic is provided. The electrochromic thermoplastic includes from about 10 wt % to about 60 wt % of a poly(vinyl alcohol), a poly(acrylic acid), a poly(acrylic acid) salt, a polyaniline salt, a poly(diallyl dimethyl ammonium chloride), a poly(ethylene-co-acrylic acid), a copolymer of any two or more thereof, or a mixture of any two or more thereof; from about 40 wt % to about 90 wt % of a solvent that includes a protic solvent; and at least one electroactive material. In some embodiments, the electrochromic thermoplastic includes from about 10 wt % to about 60 wt % of a poly(vinyl alcohol), from about 40 wt % to about 90 wt % of a protic solvent; and at least one electroactive material.

In another aspect, an electrochromic thermoplastic is provided. The electrochromic thermoplastic includes from about 10 wt % to about 60 wt % poly(vinyl alcohol); about 40 wt % to about 90 wt % of a mixture comprising water and at least one protic solvent; and at least one electroactive material. In some embodiments, the protic solvent may include an alcohol, a carboxylic acid, a primary amino compound, a secondary amino compound, or a mixture of any two or more thereof. In any of the above embodiments, the protic solvent may include a diol. In any of the above embodiments, the protic solvent may include 1,2-propanediol.

In another aspect, an electrochromic thermoplastic is provided that includes one of about 10 wt % to about 35 wt % poly(vinyl formal), about 10 wt % to about 50 wt % poly(methyl methacrylate), or about 10 wt % to about 50 wt % poly(ethylene-co-vinyl acetate); about 50 wt % to about 90 wt % of a solvent that includes an aprotic solvent; and at least one electroactive material. In any of the above embodiments, the electrochromic thermoplastic includes about 10 wt % to about 35 wt % poly(vinyl formal) or about 10 wt % to about 50 wt % poly(methyl methacrylate); about 50 wt % to about 90 wt % aprotic solvent; and at least one electroactive material.

In a further aspect, an electrochromic device is provided that includes any of the above electrochromic thermoplastics.

In another aspect, an electrochromic composite is provided that includes a first electrochromic thermoplastic that is any of those as described herein, and which includes cathodic material, a front surface and a rear surface; a second electrochromic thermoplastic that includes any of those as described above and which includes an anodic material, a front surface, and a rear surface; a layer including about 10 wt % to about 60 wt % poly(vinyl alcohol), about 10 wt % to about 35 wt % poly(vinyl formal), or about 10 wt % to about 50 wt % poly(methyl methacrylate); about 40 wt % to about 90 wt % of a solvent; a front surface; and a rear surface; where in the electrochromic composite the front surface of the layer is annealed to the rear surface of the first electrochromic thermoplastic; and the rear surface of the layer is annealed to the front surface of the second electrochromic thermoplastic.

DETAILED DESCRIPTION

Figure 1:
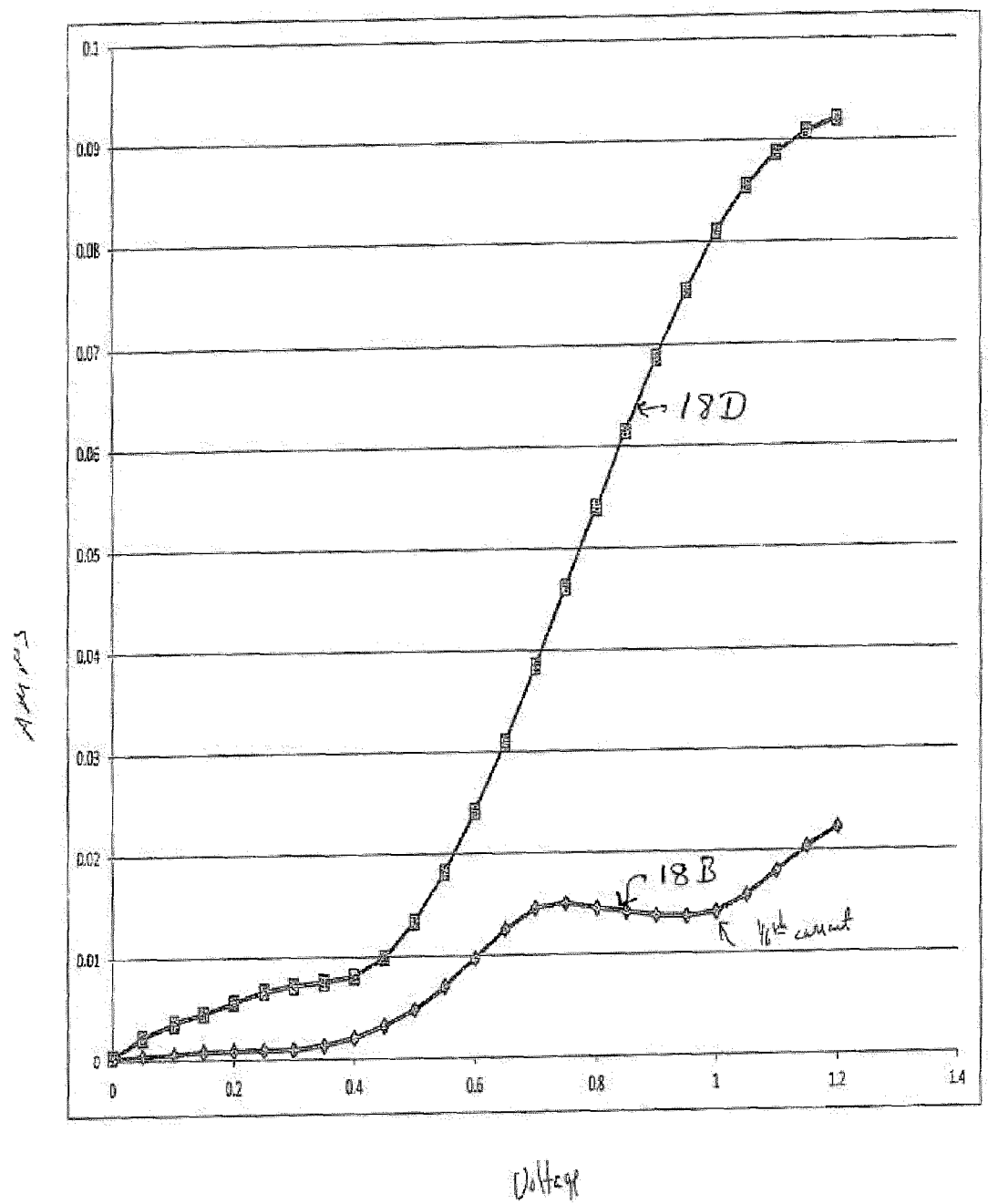
FIG. 1 presents the currents with applied voltages of a 90 micron thick electrochromic thermoplastic window of the present technology in comparison with a polyurethane gel window of the same thickness, according to the working examples.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Generally, reference to a certain element such as hydrogen or H is meant to include all isotopes of that element. For example, if an R group is defined to include hydrogen or H, it also includes deuterium and tritium. Compounds comprising radioisotopes such as tritium, $C^{14}$, $P^{32}$ and $S^{35}$ are thus within the scope of the present technology. Procedures for inserting such labels into the compounds of the present technology will be readily apparent to those skilled in the art based on the disclosure herein.

In general, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group is substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyl, heterocyclylalkyl, heterocyclyloxy, and heterocyclylalkoxy groups; carbonyls (oxo); carboxylates; esters; urethanes; oximes; hydroxylamines; alkoxyamines; aralkoxyamines; thiols; sulfides; sulfoxides; sulfones; sulfonyls; pentafluorosulfanyl (i.e., $SF_5$), sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocyclyl and heteroaryl groups also include rings and ring systems in which a bond to a hydrogen atom is replaced with a bond to a carbon atom. Therefore, substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some embodiments, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above, and include without limitation haloalkyl (e.g., trifluoromethyl), hydroxyalkyl, thioalkyl, aminoalkyl, alkylaminoalkyl, dialkylaminoalkyl, alkoxyalkyl, carboxyalkyl, and the like.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Bi- and tricyclic ring systems include both bridged cycloalkyl groups and fused rings, such as, but not limited to, bicyclo[2.1.1] hexane, adamantyl, decalinyl, and the like. Substituted cycloalkyl groups may be substituted one or more times with, non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Cycloalkylalkyl groups are alkyl groups as defined above in which a hydrogen or carbon bond of an alkyl group is replaced with a bond to a cycloalkyl group as defined above. In some embodiments, cycloalkylalkyl groups have from 4 to 16 carbon atoms, 4 to 12 carbon atoms, and typically 4 to 10 carbon atoms. Substituted cycloalkylalkyl groups may be substituted at the alkyl, the cycloalkyl or both the alkyl and cycloalkyl portions of the group. Representative substituted cycloalkylalkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Alkenyl groups have from 2 to 12 carbon atoms, and typically from 2 to 10 carbons or, in some embodiments, from 2 to 8, 2 to 6, or 2 to 4 carbon atoms. In some embodiments, the alkenyl group has one, two, or three carbon-carbon double bonds. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above.

Cycloalkenyl groups include cycloalkyl groups as defined above, having at least one double bond between two carbon atoms. In some embodiments the cycloalkenyl group may have one, two or three double bonds but does not include aromatic compounds. Cycloalkenyl groups have from 4 to 14 carbon atoms, or, in some embodiments, 5 to 14 carbon atoms, 5 to 10 carbon atoms, or even 5, 6, 7, or 8 carbon atoms. Examples of cycloalkenyl groups include cyclohexenyl, cyclopentenyl, cyclohexadienyl, cyclobutadienyl, and cyclopentadienyl.

Cycloalkenylalkyl groups are alkyl groups as defined above in which a hydrogen or carbon bond of the alkyl group is replaced with a bond to a cycloalkenyl group as defined above. Substituted cycloalkenylalkyl groups may be substituted at the alkyl, the cycloalkenyl or both the alkyl and cycloalkenyl portions of the group. Representative substituted cycloalkenylalkyl groups may be substituted one or more times with substituents such as those listed above.

Alkynyl groups include straight and branched chain alkyl groups as defined above, except that at least one triple bond exists between two carbon atoms. Alkynyl groups have from 2 to 12 carbon atoms, and typically from 2 to 10 carbons or, in some embodiments, from 2 to 8, 2 to 6, or 2 to 4 carbon atoms. In some embodiments, the alkynyl group has one, two, or three carbon-carbon triple bonds. Examples include, but are not limited to —C≡CH, —C≡CCH$_3$, —CH$_2$C≡CCH$_3$, —C≡CCH$_2$CH(CH$_2$CH$_3$)$_2$, among others. Representative substituted alkynyl groups may be mono-substituted or substituted more than once, such as, but not limited to, mono-, di- or tri-substituted with substituents such as those listed above.

Aryl groups are cyclic aromatic hydrocarbons that do not contain heteroatoms. Aryl groups herein include monocyclic, bicyclic and tricyclic ring systems. Thus, aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups are phenyl or naphthyl. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenylethyl groups and fused (cycloalkylaryl)alkyl groups such as 4-indanylethyl. Representative substituted aralkyl groups may be substituted one or more times with substituents such as those listed above.

Heterocyclyl groups include aromatic (also referred to as heteroaryl) and non-aromatic ring compounds containing 3 or more ring members, of which one or more is a heteroatom such as, but not limited to, N, O, and S. In some embodiments, the heterocyclyl group contains 1, 2, 3 or 4 heteroatoms. In some embodiments, heterocyclyl groups include mono-, bi- and tricyclic rings having 3 to 16 ring members, whereas other such groups have 3 to 6, 3 to 10, 3 to 12, or 3 to 14 ring members. Heterocyclyl groups encompass aromatic, partially unsaturated and saturated ring systems, such as, for example, imidazolyl, imidazolinyl and imidazolidinyl groups. The phrase "heterocyclyl group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocyclyl groups that have other groups, such as alkyl, oxo or halo groups, bonded to one of the ring members. Rather, these are referred to as "substituted heterocyclyl groups". Heterocyclyl groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocyclyl groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, and S. Heteroaryl groups include, but are not limited to, groups such as pyrrolyl, pyrazolyl, triazolyl, tetrazolyl, oxazolyl, isoxazolyl, thiazolyl, pyridinyl, pyridazinyl, pyrimidinyl, pyrazinyl, thiophenyl, benzothiophenyl, furanyl, benzofuranyl, indolyl, azaindolyl (pyrrolopyridinyl), indazolyl, benzimidazolyl, imidazopyridinyl (azabenzimidazolyl), pyrazolopyridinyl, triazolopyridinyl, benzotriazolyl, benzoxazolyl, benzothiazolyl, benzothiadiazolyl, imidazopyridinyl, isoxazolopyridinyl, thianaphthyl, purinyl, xanthinyl, adeninyl, guaninyl, quinolinyl, isoquinolinyl, tetrahydroquinolinyl, quinoxalinyl, and quinazolinyl groups. Heteroaryl groups include fused ring compounds in which all rings are aromatic such as indolyl groups and include fused ring compounds in which only one of the rings is aromatic, such as 2,3-dihydro indolyl groups. Although the phrase "heteroaryl groups" includes fused ring compounds, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Heterocyclylalkyl groups are alkyl groups as defined above in which a hydrogen or carbon bond of an alkyl group is replaced with a bond to a heterocyclyl group as defined above. Substituted heterocyclylalkyl groups may be substituted at the alkyl, the heterocyclyl or both the alkyl and heterocyclyl portions of the group. Representative heterocyclyl alkyl groups include, but are not limited to, morpholin-4-yl-ethyl, furan-2-yl-methyl, imidazol-4-yl-methyl, pyridin-3-yl-methyl, tetrahydrofuran-2-yl-ethyl, and indol-2-yl-propyl. Representative substituted heterocyclylalkyl groups may be substituted one or more times with substituents such as those listed above.

Heteroaralkyl groups are alkyl groups as defined above in which a hydrogen or carbon bond of an alkyl group is replaced with a bond to a heteroaryl group as defined above. Substituted heteroaralkyl groups may be substituted at the alkyl, the heteroaryl or both the alkyl and heteroaryl portions of the group. Representative substituted heteroaralkyl groups may be substituted one or more times with substituents such as those listed above.

Groups described herein having two or more points of attachment (i.e., divalent, trivalent, or polyvalent) within the compound of the present technology are designated by use of the suffix, "ene." For example, divalent alkyl groups are alkylene groups, divalent aryl groups are arylene groups, divalent heteroaryl groups are divalent heteroarylene groups, and so forth. Substituted groups having a single point of attachment to the compound of the present technology are not referred to using the "ene" designation. Thus, e.g., chloroethyl is not referred to herein as chloroethylene.

Alkoxy groups are hydroxyl groups (—OH) in which the bond to the hydrogen atom is replaced by a bond to a carbon atom of a substituted or unsubstituted alkyl group as defined above. Examples of linear alkoxy groups include but are not limited to methoxy, ethoxy, propoxy, butoxy, pentoxy, hexoxy, and the like. Examples of branched alkoxy groups include but are not limited to isopropoxy, sec-butoxy, tert-butoxy, isopentoxy, isohexoxy, and the like. Examples of cycloalkoxy groups include but are not limited to cyclopropyloxy, cyclobutyloxy, cyclopentyloxy, cyclohexyloxy, and the like. Representative substituted alkoxy groups may be substituted one or more times with substituents such as those listed above.

The terms "alkanoyl" and "alkanoyloxy" as used herein can refer, respectively, to —C(O)-alkyl groups and —O—C (O)-alkyl groups, each containing 2-5 carbon atoms.

The terms "aryloxy" and "arylalkoxy" refer to, respectively, a substituted or unsubstituted aryl group bonded to an oxygen atom and a substituted or unsubstituted aralkyl group bonded to the oxygen atom at the alkyl. Examples include but are not limited to phenoxy, naphthyloxy, and benzyloxy. Representative substituted aryloxy and arylalkoxy groups may be substituted one or more times with substituents such as those listed above.

The term "carboxylate" as used herein refers to a —COO⁻ group. A "substituted carboxylate" refers to a —C(O)O-G where G is a carboxylate protecting group. Carboxylate protecting groups are well known to one of ordinary skill in the art. An extensive list of protecting groups for the carboxylate group functionality may be found in Protective Groups in Organic Synthesis, Greene, T. W.; Wuts, P. G. M., John Wiley & Sons, New York, N.Y., (3rd Edition, 1999) which can be added or removed using the procedures set forth therein and which is hereby incorporated by reference in its entirety and for any and all purposes as if fully set forth herein.

The term "ester" as used herein refers to —COOR$^{70}$ groups. R$^{70}$ is a substituted or unsubstituted alkyl, cycloalkyl, alkenyl, alkynyl, aryl, aralkyl, heterocyclylalkyl or heterocyclyl group as defined herein.

The term "amide" (or "amido") includes C- and N-amide groups, i.e., —C(O)NR$^{71}$R$^{72}$, and —NR$^{71}$C(O)R$^{72}$ groups, respectively. R$^{71}$ and R$^{72}$ are independently hydrogen, or a substituted or unsubstituted alkyl, alkenyl, alkynyl, cycloalkyl, aryl, aralkyl, heterocyclylalkyl or heterocyclyl group as defined herein. Amido groups therefore include but are not limited to carbamoyl groups (—C(O)NH$_2$) and formamide groups (—NHC(O)H). In some embodiments, the amide is —NR$^{71}$C(O)—(C$_{1-5}$ alkyl) and the group is termed "carbonylamino," and in others the amide is —NHC (O)-alkyl and the group is termed "alkanoylamino."

The term "nitrile" or "cyano" as used herein refers to the —CN group.

Urethane groups include N- and O-urethane groups, i.e., —NR$^{73}$C(O)OR$^{74}$ and —OC(O)NR$^{73}$R$^{74}$ groups, respectively. R$^{73}$ and R$^{74}$ are independently a substituted or unsubstituted alkyl, alkenyl, alkynyl, cycloalkyl, aryl, aralkyl, heterocyclylalkyl, or heterocyclyl group as defined herein. R$^{73}$ may also be H.

The term "amine" (or "amino") as used herein refers to —NR$^{75}$R$^{76}$ groups, wherein R$^{75}$ and R$^{76}$ are independently hydrogen, or a substituted or unsubstituted alkyl, alkenyl, alkynyl, cycloalkyl, aryl, aralkyl, heterocyclylalkyl or heterocyclyl group as defined herein. In some embodiments, the amine is alkylamino, dialkylamino, arylamino, or alkylarylamino. In other embodiments, the amine is NH$_2$, methylamino, dimethylamino, ethylamino, diethylamino, propylamino, isopropylamino, phenylamino, or benzylamino.

The term "sulfonamido" includes S- and N-sulfonamide groups, i.e., —SO$_2$NR$^{78}$R$^{79}$ and —NR$^{78}$SO$_2$R$^{79}$ groups, respectively. R$^{78}$ and R$^{79}$ are independently hydrogen, or a substituted or unsubstituted alkyl, alkenyl, alkynyl, cycloalkyl, aryl, aralkyl, heterocyclylalkyl, or heterocyclyl group as defined herein. Sulfonamido groups therefore include but are not limited to sulfamoyl groups (—SO$_2$NH$_2$). In some embodiments herein, the sulfonamido is —NHSO$_2$-alkyl and is referred to as the "alkylsulfonylamino" group.

The term "thiol" refers to —SH groups, while sulfides include —SR$^{80}$ groups, sulfoxides include —S(O)R$^{81}$ groups, sulfones include —SO$_2$R$^{82}$ groups, and sulfonyls include —SO$_2$OR$^{83}$. R$^{80}$, R$^{81}$, R$^{82}$, and R$^{83}$ are each independently a substituted or unsubstituted alkyl, cycloalkyl, alkenyl, alkynyl, aryl aralkyl, heterocyclyl or heterocyclylalkyl group as defined herein. In some embodiments the sulfide is an alkylthio group, —S-alkyl.

The term "urea" refers to —NR$^{84}$—C(O)—NR$^{85}$R$^{86}$ groups. R$^{84}$, R$^{85}$, and R$^{86}$ groups are independently hydrogen, or a substituted or unsubstituted alkyl, alkenyl, alkynyl, cycloalkyl, aryl, aralkyl, heterocyclyl, or heterocyclylalkyl group as defined herein.

The term "amidine" refers to —C(NR$^{87}$)NR$^{88}$R$^{89}$ and —NR$^{87}$C(NR$^{88}$)R$^{89}$, wherein R$^{87}$, R$^{88}$, and R$^{89}$ are each independently hydrogen, or a substituted or unsubstituted alkyl, cycloalkyl, alkenyl, alkynyl, aryl aralkyl, heterocyclyl or heterocyclylalkyl group as defined herein.

The term "guanidine" refers to —NR$^{90}$C(NR$^{91}$)NR$^{92}$R$^{93}$, wherein R$^{90}$, R$^{91}$, R$^{92}$ and R$^{93}$ are each independently hydrogen, or a substituted or unsubstituted alkyl, cycloalkyl, alkenyl, alkynyl, aryl aralkyl, heterocyclyl or heterocyclylalkyl group as defined herein.

The term "enamine" refers to —C(R$^{94}$)=C(R$^{95}$)NR$^{96}$R$^{97}$ and NR$^{94}$C(R$^{95}$)C(R$^{96}$)=C(R$^{96}$)R$^{97}$, wherein R$^{94}$, R$^{95}$, R$^{96}$ and R$^{97}$ are each independently hydrogen, a substituted or unsubstituted alkyl, cycloalkyl, alkenyl, alkynyl, aryl aralkyl, heterocyclyl or heterocyclylalkyl group as defined herein.

The term "halogen" or "halo" as used herein refers to bromine, chlorine, fluorine, or iodine. In some embodiments, the halogen is fluorine. In other embodiments, the halogen is chlorine or bromine.

The term "hydroxy' as used herein can refer to —OH or its ionized form, —O⁻.

The term "imide" refers to —C(O)NR$^{98}$C(O)R$^{99}$, wherein R$^{98}$ and R$^{99}$ are each independently hydrogen, or a substituted or unsubstituted alkyl, cycloalkyl, alkenyl, alkynyl, aryl aralkyl, heterocyclyl or heterocyclylalkyl group as defined herein.

The term "imine" refers to —CR$^{100}$(NR$^{101}$) and —N(CR$^{100}$R$^{101}$) groups, wherein R$^{100}$ and R$^{101}$ are each independently hydrogen or a substituted or unsubstituted alkyl, cycloalkyl, alkenyl, alkynyl, aryl aralkyl, heterocyclyl or heterocyclylalkyl group as defined herein, with the proviso that R$^{100}$ and R$^{101}$ are not both simultaneously hydrogen.

The term "nitro" as used herein refers to an —NO$_2$ group.

The term "trifluoromethyl" as used herein refers to —CF$_3$.

The term "trifluoromethoxy" as used herein refers to —OCF$_3$.

The term "azido" refers to —N$_3$.

The term "trialkyl ammonium" refers to a —N(alkyl)$_3$ group. A trialkylammonium group is positively charged and thus typically has an associated anion, such as halogen anion.

The term "isocyano" refers to —NC.

The term "isothiocyano" refers to —NCS.

The term "pentafluorosulfanyl" refers to —SF$_5$.

The term "triflate" refers to trifluoromethansulfonate (CF$_3$SO$_3$—)

The term "substantially void" or "substantially free" as used herein means the indicated component is present in an amount less than about 0.1 weight percent (wt %) of the composition.

The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 atoms refers to groups having 1, 2, or 3 atoms. Similarly, a group having 1-5 atoms refers to groups having 1, 2, 3, 4, or 5 atoms, and so forth.

Those of skill in the art will appreciate that compounds of the present technology may exhibit the phenomena of tautomerism, conformational isomerism, geometric isomerism and/or stereoisomerism. As the formula drawings within the specification and claims can represent only one of the possible tautomeric, conformational isomeric, stereochemical or geometric isomeric forms, it should be understood that the present technology encompasses any tautomeric, conformational isomeric, stereochemical and/or geometric isomeric forms of the compounds having one or more of the utilities described herein, as well as a mixture of these various different forms.

"Tautomers" refers to isomeric forms of a compound that are in equilibrium with each other. The presence and concentrations of the isomeric forms will depend on the environment the compound is found in and may be different depending upon, for example, whether the compound is a solid or is in an organic or aqueous solution. For example, in aqueous solution, quinazolinones may exhibit the following isomeric forms, which are referred to as tautomers of each other:

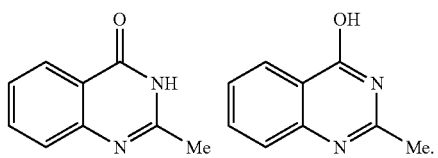

As another example, guanidines may exhibit the following isomeric forms in protic organic solution, also referred to as tautomers of each other:

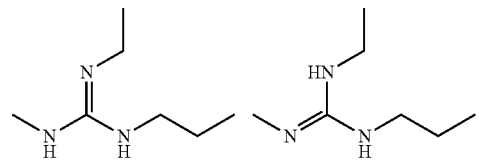

Because of the limits of representing compounds by structural formulas, it is to be understood that all chemical formulas of the compounds described herein represent all tautomeric forms of compounds and are within the scope of the present technology.

Stereoisomers of compounds (also known as optical isomers) include all chiral, diastereomeric, and racemic forms of a structure, unless the specific stereochemistry is expressly indicated. Thus, compounds used in the present technology include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these stereoisomers are all within the scope of the present technology.

The Present Technology

Electrochromic thermoplastics, composites thereof, and devices thereof have been identified and are described herein that exhibit excellent coloring and clearing times at low voltages.

In one aspect, an electrochromic thermoplastic is provided. The electrochromic thermoplastic may include from about 10 wt % to about 60 wt % of a poly(vinyl alcohol), a poly(acrylic acid), a poly(acrylic acid) salt, a polyaniline salt, a poly(diallyl dimethyl ammonium chloride), a poly (ethylene-co-acrylic acid), a copolymer of any two or more thereof, or a mixture or blend of any two or more thereof; about 40 wt % to about 90 wt % of a solvent including a protic solvent; and at least one electroactive material; where the composition does not comprise lithium chloride, tetrabutylammonium bromide, lithium bis(trifluoromethanesulfonyl)imide, lithium triflate, and lithium hexafluorophosphate. In any of the above embodiments, the electrochromic thermoplastic includes from about 10 wt % to about 60 wt % poly(vinyl alcohol), about 40 wt % to about 90 wt % protic solvent; and at least one electroactive material. The amount of poly(vinyl alcohol), poly(acrylic acid), poly (acrylic acid) salts, polyaniline salt, poly(diallyl dimethyl ammonium chloride), poly(ethylene-co-acrylic acid), copolymer of any two or more thereof, or mixture of any two or more thereof in the electrochromic thermoplastic may be from about 10 wt %, about 15 wt %, about 20 wt %, about 25 wt %, about 30 wt %, about 35 wt %, about 40 wt %, about 45 wt %, about 50 wt %, about 55 wt %, about 60 wt %, or any range including or between any two of these values. The copolymers of the present technology for any aspect or embodiment where a copolymer is present include, but are not limited to, random copolymers, statistical copolymers, periodic copolymers, alternating copolymers, and block copolymers, where the copolymers may be linear or branched. Copolymers of the present technology include two or more monomer (i.e. repeat) units.

In a related aspect, an electrochromic thermoplastic is provided that includes about 10 wt % to about 60 wt % poly(vinyl alcohol); about 40 wt % to about 90 wt % of a mixture comprising water and at least one protic solvent; and at least one electroactive material. The amount of poly(vinyl alcohol) in may be about 10 wt %, about 15 wt %, about 20 wt %, about 25 wt %, about 30 wt %, about 35 wt %, about 40 wt %, about 45 wt %, about 50 wt %, about 55 wt %, about 60 wt %, or any range including or in between any two of these values. The amount of the mixture including water and at least one protic solvent may be about 40 wt %, about 45 wt %, about 50 wt %, about 55 wt %, about 60 wt %, about 65 wt %, about 70 wt %, about 75 wt %, about 80 wt %, about 85 wt %, about 90 wt %, or any range including or in between any two of these values. It may be that the electrochromic thermoplastic does not include lithium chloride, tetrabutylammonium bromide, lithium bis(trifluoromethanesulfonyl)imide, lithium triflate, and lithium hexafluorophosphate.

In another related aspect, an electrochromic thermoplastic is provided that includes about 10 wt % to about 35 wt % poly(vinyl formal), about 10 wt % to about 50 wt % poly(methyl methacrylate), or about 10 wt % to about 50 wt % poly(ethylene-co-vinyl acetate); about 50 wt % to about 90 wt % of a solvent that includes an aprotic solvent; and at least one electroactive material. In any of the above embodiments, the electrochromic thermoplastic may include about 10 wt % to about 35 wt % poly(vinyl formal) or about 10 wt % to about 50 wt % poly(methyl methacrylate); about 50 wt % to about 90 wt % aprotic solvent; and at least one electroactive material. The amount of poly(vinyl formal) may be about 10 wt %, about 15 wt %, about 20 wt %, about 25 wt %, about 30 wt %, about 35 wt %, or any range including and in between any two of these values; the amount of poly(methyl methacrylate) may be about 10 wt %, about 15 wt %, about 20 wt %, about 25 wt %, about 30 wt %, about 35 wt %, about 40 wt %, about 45 wt %, about 50 wt %, or any range including and in between any two of these values; the amount of poly(ethylene-co-vinyl acetate) may be about 10 wt %, about 15 wt %, about 20 wt %, about 25 wt %, about 30 wt %, about 35 wt %, about 40 wt %, about 45 wt %, about 50 wt %, or any range including and in between any two of these values. It may be that the electrochromic thermoplastic does not include lithium chloride, tetrabutylammonium bromide, lithium bis(trifluoromethanesulfonyl)imide, lithium triflate, and lithium hexafluorophosphate.

Protic solvents as used herein include, but are not limited to, alcohols (e.g., methanol ($CH_3OH$), ethanol (EtOH), isopropanol (iPrOH), trifluoroethanol (TFE), butanol (BuOH), ethylene glycol, propylene glycol), carboxylic acids (e.g., formic acid, acetic acid, propanoic acid, butanoic acid, pentanoic acid, lauric acid, stearic acid, deoxycholic acid, glutamic acid, glucuronic acid), ammonia ($NH_3$), a primary amino compound (e.g., methyl amine, ethyl amine, propyl amine), a secondary amino compound (e.g., dimethyl amine, diethyl amine, di(n-propyl) amine), water, or a mixture of any two or more thereof. Thus, in any of the above embodiments and aspects, the protic solvent may include an alcohol, a carboxylic acid, a primary amino compound, a secondary amino compound, water, or a mixture of any two or more thereof. In any of the above embodiments and aspects, the protic solvent may include a diol. In any of the above embodiments and aspects, the protic solvent may include water. The amount of protic solvent in the electrochromic thermoplastic may be about 40 wt %, about 45 wt %, about 50 wt %, about 55 wt %, about 60 wt %, about 65 wt %, about 70 wt %, about 75 wt %, about 80 wt %, about 85 wt %, about 90 wt %, or any range including or in between any two of these values.

An aprotic solvent as used herein includes, but is not limited to, a carbonate, a halogenated solvent, an ether, an ester, a ketone, a tertiary amide, a nitrile, a sulfoxide, a sulfone, or a mixture of any two or more thereof. In any of the above embodiments and aspects, the aprotic solvent may be a polar aprotic solvent. Polar aprotic solvents as used herein include halogenated solvents (e.g., methylene chloride ($CH_2Cl_2$), chloroform ($CHCl_3$), benzotrifluoride (BTF; $PhCF_3$)), ethers (e.g., tetrahydrofuran (THF), 2-methyltetrahydrofuran (2Me-THF), dimethoxyethane (DME), dioxane), esters (e.g., ethyl acetate, isopropyl acetate), ketones (e.g., acetone, methylethyl ketone, methyl isobutyl ketone), carbonates (e.g., ethylene carbonate, propylene carbonate, trimethylene carbonate), amides (e.g., dimethylformamide (DMF), dimethylacetamide (DMA)), nitriles (e.g., acetonitrile ($CH_3CN$), propionitrile ($CH_3CH_2CN$), benzonitrile (PhCN)), sulfoxides (e.g., dimethyl sulfoxide), sulfones (e.g., sulfolane), or a mixture of any two or more thereof. In any of the above embodiments and aspects, the aprotic solvent may include a cyclic carbonate such as ethylene carbonate, propylene carbonate, butylene carbonate, trimethylene carbonate, 2,2-dimethyltrimethylene carbonate, a cyclic ester such as α-acetolactone, β-propiolactone, γ-butyrolactone, γ-valerolactone, δ-valerolactone, γ-caprolactone, δ-caprolactone, ε-caprolactone, or a combination of any two or more thereof. In any of the above embodiments and aspects, the amount of aprotic solvent may be about 50 wt %, about 55 wt %, about 60 wt %, about 65 wt %, about 70 wt %, about 75 wt %, about 80 wt %, about 85 wt %, about 90 wt %, or any range including or in between any two of these values.

The electroactive material may be present in the electrochromic thermoplastic in a concentration of about 1 millimolar (mM) to the solubility limit of the electroactive material in the electrochromic thermoplastic. The concentration of each electroactive material in the electrochromic thermoplastic may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, about 55 mM, about 60 mM, about 65 mM, about 70 mM, about 75 mM, about 80 mM, about 85 mM, about 90 mM, about 95 mM, about 100 mM, or any range including and in between any two of these values.

In any of the above embodiments and aspects, the at least one electroactive material may include a cathodic material or an anodic material. Cathodic electrochromic materials include, but are not limited to, those as described in U.S. Pat. Nos. 4,902,108; 5,998,617; and 6,193,912, and U.S. Provisional Patent Appl. Nos. 62/257,950 and 62/258,051. The cathodic material may include a viologen. In any of the above embodiments and aspects, the viologen may be represented by Formula (I):

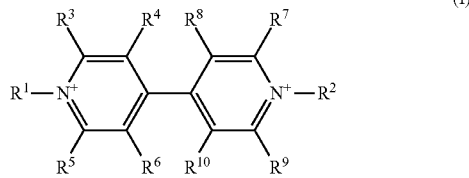

wherein $R^1$ and $R^2$ are each independently an alkyl group substituted with a carboxylate, phosphonate, phosphate, or sulfonate; $R^3$, $R^4$, $R^5$, $R^6$, $R^7$, $R^8$, $R^9$, and $R^{10}$ are each independently H, $OR^{11}$, F, Cl, Br, I, CN, $NO_2$, alkyl, or aryl; and $R^{11}$ is H or alkyl. In any of the above embodiments and aspects, the viologen may be represented by Formula (III) or (IV):

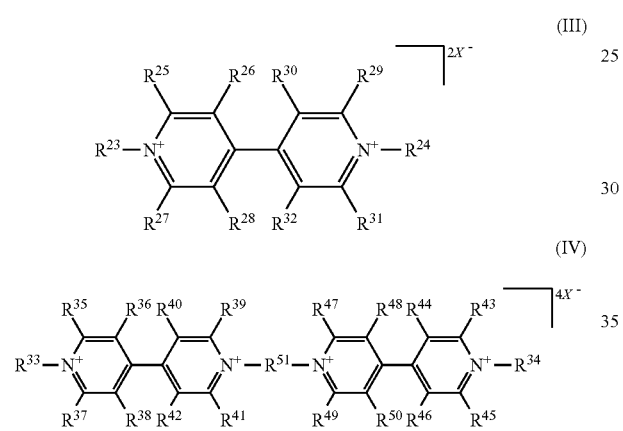

where in Formula (III)
  $R^{23}$ and $R^{24}$ are each independently alkyl, siloxy alkyl, hydroxyalkyl, alkenyl, or aralkyl;
  $R^{25}$, $R^{26}$, $R^{27}$, $R^{28}$, $R^{29}$, $R^{30}$, $R^{31}$, and $R^{32}$ are each independently H, OH, F, Cl, Br, I, CN, $NO_2$, alkyl, or aryl; and
  X is an anion; and
where in Formula (IV)
  $R^{33}$ and $R^{34}$ are each independently alkyl, siloxyalkyl, hydroxyalkyl, alkenyl, or aralkyl;
  $R^{35}$, $R^{36}$, $R^{37}$, $R^{38}$, $R^{39}$, $R^{40}$, $R^{41}$, $R^{42}$, $R^{43}$, $R^{44}$, $R^{45}$, $R^{46}$, $R^{47}$, $R^{48}$, and $R^{50}$ are each independently H, OH, F, Cl, Br, I, CN, $NO_2$, alkyl, or aryl;
  $R^{51}$ is $(CH_2)_{n'}$ or arylene;
  n' is from 1 to 12; and
  X is an anion.
In any of the above embodiments and aspects, it may be the anion of Formula (III) or (IV) is a halide, a borate, a fluoroborate, a tetraaryl borate, a hexafluoro metal or metalloid, a sulfate, a sulfonate, a sulfonamide, a carboxylate, a perchlorate, a tetrachloroferrate, or a mixture of any two or more thereof. In any of the above embodiments and aspects, the anion of Formula (III) or (IV) may be F, Cl, Br, I, $BF_4$, $PF_6$, $SbF_6$, $AsF_6$, $ClO_4$, $N(CF_3SO_2)_2$, $C(CF_3SO_2)_3$, triflate, $N(SO_2C_2F_5)$, or $BAr_4$, wherein Ar is an aryl, fluorinated aryl, or a bis(trifluoromethyl)aryl group. In any of the above embodiments and aspects, it may be that the cathodic material includes two or more viologens of any one or more of Formulas (I), (III), and (IV).

Anodic electrochromic materials may include, but are not limited to, those as illustrated in U.S. Pat. Nos. 4,902,108; 5,998,617; and 6,193,912, and U.S. Provisional Patent Appl. Nos. 62/257,950 and 62/258,051. In any of the above embodiments, the anodic material may include one or more of a phenothiazine, a phenoxazine, a triphenodithiazine, a triphenodioxazine, a carbazole, a benzoimidazoleazine, a benzothiazoleazine, a benzoxazoleazine, or combinations of any two or more thereof, where at least one nitrogen of the recited anodic material is substituted with a carboxylate, phosphonate, phosphate, or sulfonate, or a substituted alkyl group where the substituent of the alkyl group is a carboxylate, phosphonate, phosphate, or sulfonate. In any of the above embodiments and aspects, the anodic material may include a compound represented by Formula (II)

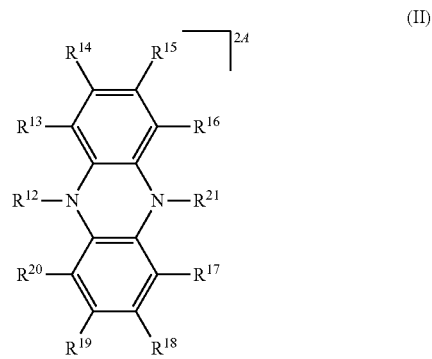

where $R^{12}$ and $R^{21}$ are each independently an alkyl group substituted with a carboxylate, phosphonate, phosphate, or sulfonate; $R^{13}$, $R^{14}$, $R^{15}$, $R^{16}$, $R^{17}$, $R^{18}$, $R^{19}$, and $R^{20}$ are each independently H, F, Cl, Br, I, CN, $OR^{22}$, $SR^{22}$, $NO_2$, alkyl, aryl, or amino, or any two adjacent $R^{13}$, $R^{14}$, $R^{15}$, $R^{16}$, $R^{17}$, $R^{18}$, $R^{19}$, and $R^{20}$ join to form a monocyclic, polycyclic, or heterocyclic group; each $R^{22}$ is independently at each occurrence H or alkyl; and A is a cation. In any of the above embodiments and aspects, the composition may include at least two compounds represented by Formula (II). In any of the above embodiments and aspects, the at least one anodic material may be a compound represented by Formula (V) or (VI):

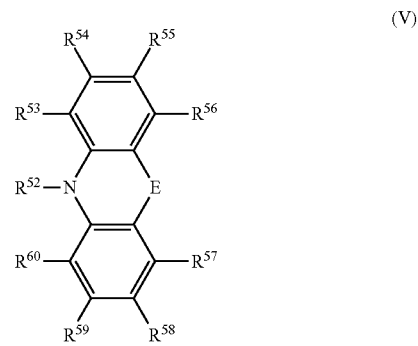

-continued

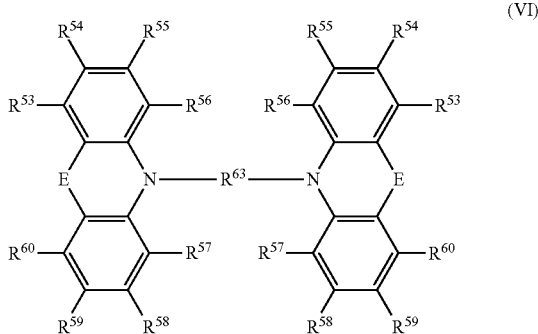

(VI)

where E is S or $NR^{61}$; $R^{52}$ and $R^{61}$ are each independently an alkyl group optionally interrupted by at least one ammonium group; $R^{53}$, $R^{54}$, $R^{55}$, $R^{56}$, $R^{57}$, $R^{58}$, $R^{59}$, and $R^{60}$ are each independently H, F, Cl, Br, I, CN, $OR^{62}$, $SR^{62}$, $NO_2$, alkyl, aryl, or amino, or any two adjacent groups of $R^{53}$, $R^{54}$, $R^{55}$, $R^{56}$, $R^{57}$, $R^{58}$, $R^{59}$, and $R^{60}$ join to form a monocyclic, polycyclic, or heterocyclic group; each $R^{62}$ is independently at each occurrence H or alkyl; and $R^{63}$ is an alkylene group. In any of the above embodiments and aspects, the electrochromic thermoplastic may include at least two compounds represented by any one or more of Formulas (II), (V), and (VI). In any of the above embodiments and aspects, it may be that the electrochromic thermoplastic includes at least one cathodic material and at least one anodic material. In any of the above embodiments and aspects, the electrochromic thermoplastic may include two or more cathodic materials. In any of the above embodiments and aspects, the electrochromic thermoplastic may include two or more anodic materials.

In any of the above embodiments and aspects, the electrochromic thermoplastic may include one or more of a redox buffer, an ultraviolet light ("UV") stabilizer, an oxygen scavenger, an antioxidant, a reductant, or combinations of any two or more thereof.

Redox buffers may include, but are not limited to, those as described in U.S. Pat. No. 6,188,505. Redox buffers may include, but are not limited to, ferrocenes such as ferrocene, octamethyl-dihexanol ferrocene, decamethyl ferrocene, or nonamethyl, methanol ferrocene. The concentration of each buffer in the electrochromic thermoplastic may each independently be from about 0.1 mM to about 10 mM. For example, ferrocene-type buffers and ferrocinium-type buffers are two types of redox buffers. Ferrocene-type buffers include, but are not limited to, octamethyl-dihexanol ferrocene; nonamethyl-methanol ferrocene; decamethyl ferrocene; di-tert-butyl-diethylferrocene, and 6-(tetra-tert-butylferrocenyl)hexyl) triethylammonium tetrafluoroborate. The concentration of each ferrocene-type buffer in the electrochromic thermoplastic may independently be from about 0.1 mM to about 10 mM for each ferrocene-type buffer. Ferrocinium-type buffers include, but are not limited to, octamethyl-dihexanol ferrocenium; nonamethyl-methanol ferrocenium; decamethyl ferrocenium and 6-(tetra-tert-butylferrocenium)hexyl)triethylammonium di-tetrafluoroborate. The concentration of each ferrocinium-type buffer in the electrochromic thermoplastic may independently be from about 0.1 mM to about 10 mM for each ferrocinium-type buffer.

UV stabilizers may include, but are not limited to, those as described in U.S. Pat. No. 5,140,455. For example, UV stabilizers include, but are not limited to, oxybenzones and tinuvins. The concentration of each UV stabilizer in the electrochromic thermoplastic in a concentration may be about 1 millimolar (mM) up to the solubility limit of the UV stabilizer in the electrochromic thermoplastic. The concentration of each UV stabilizer in the electrochromic thermoplastic may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, about 55 mM, about 60 mM, about 65 mM, about 70 mM, about 75 mM, about 80 mM, about 85 mM, about 90 mM, about 95 mM, about 100 mM, about 110 mM, about 120 mM, about 130 mM, about 140 mM, about 150 mM, about 160 mM, about 170 mM, about 180 mM, about 190 mM, about 200 mM, about 220 mM, about 240 mM, about 260 mM, about 280 mM, about 300 mM, or any range including and in between any two of these values.

Oxygen scavengers include, but are not limited to, D-isoascorbic acid. The concentration of each oxygen scavenger in the electrochromic thermoplastic may be from about 1 millimolar (mM) up to the solubility limit in the electrochromic thermoplastic. The concentration of each oxygen scavenger in the electrochromic thermoplastic may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and in between any two of these values.

Antioxidants include, but are not limited to, butylated hydroxytoluene (BHT), The concentration of each antioxidant in the electrochromic thermoplastic may be from about 1 millimolar (mM) up to the solubility limit in the electrochromic thermoplastic. The concentration of each antioxidant in the electrochromic thermoplastic may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and in between any two of these values.

Reductants include, but are not limited to, amines, hydroquinones. The concentration of each reductant in the electrochromic thermoplastic may be about 1 millimolar (mM) to about 50 mM. The concentration of each oxygen scavenger in the electrochromic thermoplastic may independently be about 1 mM, about 2 mM, about 3 mM, about 4 mM, about 5 mM, about 6 mM, about 7 mM, about 8 mM, about 9 mM, about 10 mM, about 11 mM, about 12 mM, about 13 mM, about 14 mM, about 15 mM, about 16 mM, about 17 mM, about 18 mM, about 19 mM, about 20 mM, about 22 mM, about 24 mM, about 26 mM, about 28 mM, about 30 mM, about 32 mM, about 34 mM, about 36 mM, about 38 mM, about 40 mM, about 42 mM, about 44 mM, about 46 mM, about 48 mM, about 50 mM, or any range including and in between any two of these values.

The electrochromic thermoplastics may further include a plasticizer, such as dibutyl phthalate. Such plasticizers may enhance the elasticity and prevent tearing of the electrochromic thermoplastic under stress. The amount of plasticizer that may be included ranges from about 1 wt % to about 8 wt % of the electrochromic thermoplastic; the amount of plasticizer included in the electrochromic thermoplastic may be about 1 wt %, about 2 w %, about 3 wt %, about 4 wt %, about 5 wt %, about 6 wt %, about 7 wt %, about 8 wt %, or any range including and in between any two of these values.

In any of the above embodiments and aspects, it may be the electrochromic thermoplastic is about 50 microns to about 900 microns thick. The thickness of the electrochromic thermoplastic may be about 50 microns, about 60 microns, about 70 microns, about 80 microns, about 90 microns, about 100 microns, about 110 microns, about 120 microns, about 130 microns, about 140 microns, about 150 microns, about 160 microns, about 170 microns, about 180 microns, about 190 microns, about 200 microns, about 220 microns, about 240 microns, about 260 microns, about 280 microns, about 300 microns, about 350 microns, about 400 microns, about 450 microns, about 500 microns, about 550 microns, about 600 microns, about 650 microns, about 700 microns, about 750 microns, about 800 microns, about 850 microns, about 900 microns, or any range including and in between any two of these values.

In an aspect, an electrochromic device is provided that includes the electrochromic thermoplastic of any one of the above embodiments and aspects. In this aspect, the electrochromic thermoplastic may comprise a front surface and a rear surface, and the electrochromic device may include a first conductive surface of a first substrate and a second conductive surface of a second substrate, where the first conductive surface contacts the front surface of the electrochromic thermoplastic and the second conductive surface contracts the rear surface of the electrochromic thermoplastic. The first conducive surface may be annealed to front surface of the electrochromic thermoplastic and the second conductive surface may be annealed to the rear surface of the electrochromic thermoplastic The device may further include a sealing member joining the first substrate to the second substrate. The first and second substrates may be off-set to one another to allow for electric contact to be made with the first and second conductive surfaces. The conductive surface may include one or more layers of electrically conductive material. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art. Several other electrochromic device configurations are contemplated for use, including, but not limited to, those disclosed in U.S. Pat. Nos. 5,818,625; 6,597,489; and 6,700,692, all of which are hereby incorporated herein by reference in their entirety including all references incorporated therein.

In an aspect, an electrochromic composite is provided that includes a first electrochromic thermoplastic that is any of those as described herein, and where the first electrochromic thermoplastic includes cathodic material, a front surface and a rear surface; a second electrochromic thermoplastic that includes any of those as described above and which includes an anodic material, a front surface, and a rear surface; a layer including about 10 wt % to about 60 wt % poly(vinyl alcohol), about 10 wt % to about 35 wt % poly(vinyl formal), or about 10 wt % to about 50 wt % poly(methyl methacrylate); about 40 wt % to about 90 wt % of a solvent; a front surface; and a rear surface; where in the electrochromic composite the front surface of the layer is annealed to the rear surface of the first electrochromic thermoplastic; and the rear surface of the layer is annealed to the front surface of the second electrochromic thermoplastic.

In many embodiments, the electrochromic composite includes a first electrochromic thermoplastic of any one of the above embodiments and aspects that includes a cathodic material, a front surface, and a rear surface; a second electrochromic thermoplastic of any one of the above embodiments and aspects that includes an anodic material, a front surface, and a rear surface; a layer that includes about 10 wt % to about 60 wt % poly(vinyl alcohol); about 40 wt % to about 90 wt % of a solvent that includes a protic solvent; a front surface; and a rear surface; where the front surface of the layer is annealed to the rear surface of the first electrochromic thermoplastic; and the rear surface of the layer is annealed to the front surface of the second electrochromic thermoplastic. Cathodic and anodic materials for the electrochromic composite include any one or more of those discussed previously herein. The amount of poly(vinyl alcohol) in the layer of the electrochromic composite may be about 10 wt %, about 15 wt %, about 20 wt %, about 25 wt %, about 30 wt %, about 35 wt %, about 40 wt %, about 45 wt %, about 50 wt %, about 55 wt %, about 60 wt %, or any range including or in between any two of these values.

In many embodiments, the electrochromic composite includes a first electrochromic thermoplastic of any one of the above embodiments and aspects which includes a cathodic material, a front surface, and a rear surface; a second electrochromic thermoplastic of any one of the above embodiments and aspects which includes an anodic material, a front surface, and a rear surface; and a layer that includes about 10 wt % to about 35 wt % poly(vinyl formal) or about 10 wt % to about 50 wt % poly(methyl methacrylate), about 50 wt % to about 90 wt % of a solvent that includes an aprotic solvent, an electrolyte salt, a front surface, and a rear surface; where the front surface of the layer is annealed to the rear surface of the first electrochromic thermoplastic; and the rear surface of the layer is annealed to the front surface of the second electrochromic thermoplastic. Cathodic and anodic materials for the electrochromic composite include any one or more of those discussed previously herein.

The solvents of the layer in the electrochromic composite include protic solvents, aprotic solvents, and a mixture thereof. The protic solvent in the layer may be the same protic solvent or mixture used in the first and/or second electrochromic thermoplastic, or may be a different solvent (protic or aprotic) or mixture. As noted previously, protic solvents as include, but are not limited to, alcohols (e.g., methanol ($CH_3OH$), ethanol (EtOH), isopropanol (iPrOH), trifluoroethanol (TFE), butanol (BuOH), ethylene glycol, propylene glycol), carboxylic acids (e.g., formic acid, acetic acid, propanoic acid, butanoic acid, pentanoic acid, lauric acid, stearic acid, deoxycholic acid, glutamic acid, glucuronic acid), ammonia ($NH_3$), a primary amino compound (e.g., methyl amine, ethyl amine, propyl amine), a secondary amino compound (e.g., dimethyl amine, diethyl amine, di(n-propyl) amine), water, or a mixture of any two or more thereof. Thus, in any of the above embodiments, the protic solvent may include an alcohol, a carboxylic acid, a primary amino compound, a secondary amino compound, water, or a mixture of any two or more thereof. In any of the above embodiments, the protic solvent may include a diol. In any of the above embodiments, the protic solvent may include water. The amount of protic solvent in the layer may be about 40 wt %, about 45 wt %, about 50 wt %, about 55 wt %, about 60 wt %, about 65 wt %, about 70 wt %, about 75 wt %, about 80 wt %, about 85 wt %, about 90 wt %, or any range including or in between any two of these values.

The aprotic solvent of the layer may include a carbonate, a halogenated solvent, an ether, an ester, a ketone, a tertiary amide, a nitrile, a sulfoxide, a sulfone, or a mixture of any two or more thereof. The aprotic solvent in the layer may be the same aprotic solvent or mixture used in the first and/or second electrochromic thermoplastic, or may be different solvent (protic or aprotic) or mixture. The aprotic solvent of the layer may include a polar aprotic solvent. As discussed previously, polar aprotic solvents as used herein include halogenated solvents (e.g., methylene chloride ($CH_2Cl_2$), chloroform ($CHCl_3$), benzotrifluoride (BTF; $PhCF_3$)), ethers (e.g., tetrahydrofuran (THF), 2-methyltetrahydrofuran (2Me-THF), dimethoxyethane (DME), dioxane), esters (e.g., ethyl acetate, isopropyl acetate), ketones (e.g., acetone, methylethyl ketone, methyl isobutyl ketone), carbonates (e.g., ethylene carbonate, propylene carbonate, trimethylene carbonate), amides (e.g., dimethylformamide (DMF), dimethylacetamide (DMA)), nitriles (e.g., acetonitrile ($CH_3CN$), propionitrile ($CH_3CH_2CN$), benzonitrile (PhCN)), sulfoxides (e.g., dimethyl sulfoxide), sulfones (e.g., sulfolane), or a mixture of any two or more thereof. In any of the above embodiments, the aprotic solvent of the layer may include a cyclic carbonate such as ethylene carbonate, propylene carbonate, butylene carbonate, trimethylene carbonate, 2,2-dimethyltrimethylene carbonate, a cyclic ester such as α-acetolactone, β-propiolactone, γ-butyrolactone, γ-valerolactone, δ-valerolactone, δ-caprolactone, δ-caprolactone, ε-caprolactone, or a combination of any two or more thereof. In any of the above embodiments, the amount of aprotic solvent in the layer may be about 50 wt %, about 55 wt %, about 60 wt %, about 65 wt %, about 70 wt %, about 75 wt %, about 80 wt %, about 85 wt %, about 90 wt %, or any range including or in between any two of these values.

In any of the above embodiments of the electrochromic composite, it may be the layer is about 50 microns to about 900 microns thick. The thickness of the layer may be about 50 microns, about 60 microns, about 70 microns, about 80 microns, about 90 microns, about 100 microns, about 110 microns, about 120 microns, about 130 microns, about 140 microns, about 150 microns, about 160 microns, about 170 microns, about 180 microns, about 190 microns, about 200 microns, about 220 microns, about 240 microns, about 260 microns, about 280 microns, about 300 microns, about 350 microns, about 400 microns, about 450 microns, about 500 microns, about 550 microns, about 600 microns, about 650 microns, about 700 microns, about 750 microns, about 800 microns, about 850 microns, about 900 microns, or any range including and in between any two of these values.

In any of the above embodiments of the electrochromic composite, the layer may further include an electrolyte salt. In any of the above embodiments, the electrolyte salt may include $N(CH_3CH_2)_4BF_4$, $N(CH_3)_4BF_4$, $NH_4PF_6$, $LiSO_3CF_3$, $LiN(CF_3SO_2)_2$, $LiBF4$, or a mixture of any two or more thereof. The electrolyte salt may include a halide salt. In any of the above embodiments of the electrochromic composite, the electrolyte salt may include sodium chloride, lithium chloride, sodium bromide, lithium bromide, or a combination of any two or more thereof. It may be that an electrochromic device includes any of the above embodiments of the electrochromic composite.

In an aspect, an electrochromic device is provided that includes any of the above embodiments of the electrochromic composite. The electrochromic device may include a first conductive surface of a first substrate and a second conductive surface of a second substrate, where the first conductive surface contacts the front surface of the first electrochromic thermoplastic and the second conductive surface contracts the rear surface of the second electrochromic thermoplastic. The first conducive surface may be annealed to front surface of the electrochromic thermoplastic and the second conductive surface may be annealed to the rear surface of the electrochromic thermoplastic The device may further include a sealing member joining the first substrate to the second substrate. The first and second substrates may be off-set to one another to allow for electric contact to be made with the first and second conductive surfaces. The conductive surface may include one or more layers of electrically conductive material. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art. Several other electrochromic device configurations are contemplated for use, including, but not limited to, those disclosed in U.S. Pat. Nos. 5,818,625; 6,597,489; and 6,700,692, all of which are hereby incorporated herein by reference in their entirety including all references incorporated therein.

In any aspect including an electrochromic device, the first substrate may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, polysulfones, polyethylene naphthalate (PEN), ethylene vinyl acetate (EVA), acrylate polymers, as well as Topas®. In another embodiment, the first substrate is fabricated from a sheet of glass having a thickness ranging from about 0.10 millimeters (mm) to about 12.7 mm. This may include any range of thickness such as from about 0.50 mm to about 1.50 mm, or from about 0.65 mm to about 1.00 mm. Of course, the thickness of the substrate will depend upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, electrochromic devices in accordance with the present invention can be, during normal operation, exposed to extreme temperature variation as well as substantial UV radiation, emanating primarily from the sun. It will be further understood that first substrate and/or second substrate may comprise a UV absorbing layer and/or contain a UV absorbing material to help protect the substrate(s) and/or the electrochromic thermoplastic and/or electrochromic composite from UV damage.

In some embodiments, the second substrate may be fabricated from similar materials as that of the first substrate, or where transparency of the second substrate is not desired, the second substrate may be a metal. The second substrate is fabricated from a sheet of glass or plastic having a thickness ranging from about 0.10 mm to about 12.7 mm. This may include thicknesses from about 0.50 mm to about 1.50 mm, or from about 0.65 mm to about 1.00 mm. If the first and second substrates are fabricated from sheets of glass, then the glass can optionally be tempered, heat strengthened, chemically strengthened, and/or laminated prior to or subsequent to being coated with layers of electrically conductive material.

The first conductive surface of a first substrate may be a rear surface and the first substrate may include a front surface. One or more layers of electrically conductive material may be associated with the front surface of the first substrate. These layers serve as an electrode for the electrochromic device. Electrically conductive material is desirably a material that: (a) is substantially transparent in the visible region of the electromagnetic spectrum; (b) bonds reasonably well to the first substrate; (c) maintains this bond when associated with a sealing member; (d) is generally resistant to corrosion from materials contained within the electrochromic device or the atmosphere; and (e) exhibits minimal diffuse or specular reflectance as well as sufficient electrical conductance. It is contemplated that the electrically conductive material may be fabricated from fluorine doped tin oxide (FTO), for example TEC glass, indium/tin oxide (ITO), doped zinc oxide, indium zinc oxide, metal oxide/metal/metal oxide (wherein metal oxide can be substituted with metal carbide, metal nitride, metal sulfide, etc.), or other materials known to those having ordinary skill in the art.

The second conductive surface of a second substrate may be a front surface of the second substrate and the second substrate may further include a rear surface. One or more layers of an electrically conductive material made of the same or different materials as those associated with the front surface of the first substrate may be associated the rear surface of the second substrate. The electrically conductive material may be operatively bonded to electrically conductive material associate with the first substrate by a sealing member. Once bonded, the sealing member, and/or the juxtaposed portions of electrically conductive materials may serve to generally define an inner peripheral geometry of a chamber. Alternatively, edge sealing techniques may be utilized which are disclosed in U.S. Pat. No. 7,372,611.

The sealing member may include any material that is configured to adhesively bond to the electrically conductive materials coated on the first and second substrate. It is also contemplated that the sealing member extends all the way to rear surface and front surface of their respective substrates. The layers of electrically conductive material coated on the first and second substrates may be partially removed where the sealing member is positioned. If the electrically conductive materials are not associated with their respective substrates, then the sealing member preferably bonds well to glass. The sealing member may include a composition including from about 10 wt % to about 60 wt % of a poly(vinyl alcohol), a poly(acrylic acid), a poly(acrylic acid) salt, a polyaniline salt, a poly(diallyl dimethyl ammonium chloride), a poly(ethylene-co-acrylic acid), a copolymer of any two or more thereof, or a mixture or blend of any two or more thereof; about 40 wt % to about 90 wt % of a solvent including protic solvent. The sealing member may include a composition that includes about 10 wt % to about 35 wt % poly(vinyl formal), about 10 wt % to about 50 wt % poly(methyl methacrylate), or about 10 wt % to about 50 wt % poly(ethylene-co-vinyl acetate); about 50 wt % to about 90 wt % of a solvent that includes an aprotic solvent. It will be understood that sealing member can be fabricated from any one of a number of materials including, for example, those disclosed in U.S. Pat. Nos. 4,297,401; 4,418,102; 4,695,490; 5,596,023; 5,596,024; 6,157,480; and 6,714,334.

Illustrative electrochromic devices employing the electrochromic thermoplastics and the electrochromic composites described herein may include, for illustrative purposes only, a window, an aircraft transparency, a mirror, a display device, and the like. In some embodiments, the electrochromic device is an electrochromic window or an electrochromic mirror. In some embodiments, the device is a vehicular interior electrochromic mirror. In some embodiments, the device is a variable transmission electrochromic window. In some embodiments, the device is an aircraft window system. Other applications of the electrochromic device includes screens for watches, calculators and computer display screens; eye wear such as eyeglasses and sunglasses; switchable mirrors, sun visors; automobile, architectural, aircraft, marine, and spacecraft windows; information display boards and digital billboards and the like.

The examples herein are provided to illustrate advantages of the present technology and to further assist a person of ordinary skill in the art with preparing or using the present technology. The examples herein are also presented in order to more fully illustrate the preferred aspects of the present technology. The examples should in no way be construed as limiting the scope of the present technology, as defined by the appended claims. The examples can include or incorporate any of the variations, aspects or aspects of the present technology described above. The variations, aspects or aspects described above may also further each include or incorporate the variations of any or all other variations, aspects or aspects of the present technology.

EXAMPLES

Electrochromic Thermoplastics with Poly(Vinyl Alcohol)

Example 1

To a 78:22 1,2 propanediol:water solution at 85° C. was added of phenazine 1, phenazine 2, and sulfonate viologen 1 so that the respective concentrations of these was 10 mM, 2.5 mM, and 15 mM.

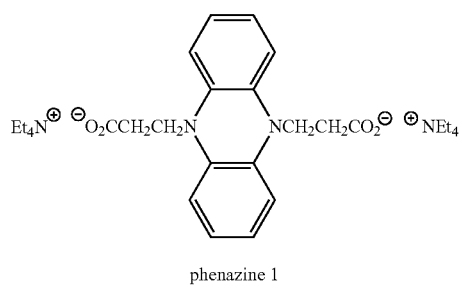

phenazine 1

-continued

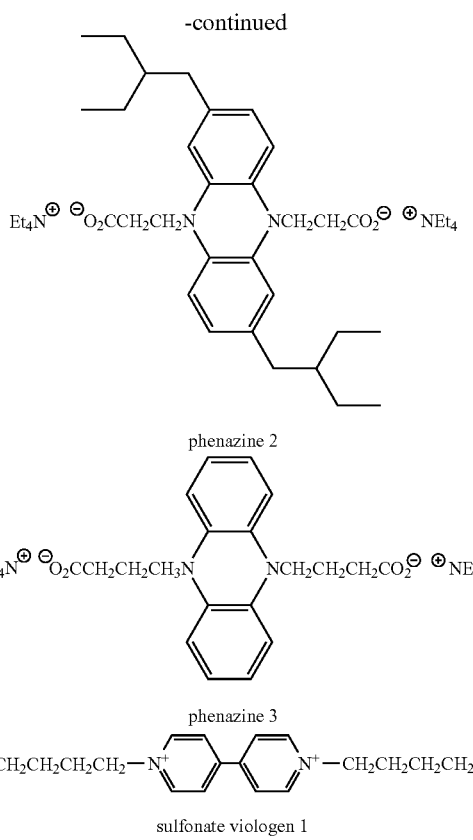

phenazine 2 phenazine 3 sulfonate viologen 1

The resulting solution was maintained at 85° C. and poly (vinyl alcohol) (87-89% hydrolyzed; MW 13,000-23,000) was added an amount of 23% by weight. Cooling the resulting melt to room temperature provided a flexible thermoplastic.

Example 2

To a 1,2-propanediol:water (78:22 based on volume) solution at 85° C. was added phenazine 1 and sulfonate viologen 1 so that the respective concentrations of these was 10 mM and 10 mM. The resulting solution was maintained at 85° C. and poly(vinyl alcohol) (87-89% hydrolyzed; MW 13,000 g/mol to 23,000 g/mol) was added an amount of 23% by weight. The resulting melt was poured onto an indium tin oxide (ITO) coated glass substrate, a number of 500 micron glass beads were added, and another ITO-coated glass substrate placed on top (with the ITO-coating in contact with the melt), providing the melt between the two ITO-coated glass substrates. The top substrate was positioned with an offset to the bottom substrate allowing access and electrical contact to the ITO coating on the edges. Subsequent heating to approximately 100° C. to anneal the layers and the device was cooled to room temperature. The cooled device exhibited a high end and low end transmission of 67% and 8%, respectively.

Example 3

To a 1,2-propanediol:water (78:22) solution at 85° C. was added phenazine 1 and sulfonate viologen 1 so that the respective concentrations were 10 mM and 11 mM. The resulting solution was maintained at 85° C. and poly(vinyl alcohol) (87-89% hydrolyzed; MW 13,000 g/mol to 23,000 g/mol) was added an amount of 23% by weight. The resulting melt was poured onto an indium zinc oxide (IZO)-coated polycarbonate substrate, some 500 micron glass beads were added, and another IZO-coated polycarbonate substrate placed on top of the melt such that the melt was in between the IZO-coated polycarbonate substrates. The top substrate was positioned with an offset to the bottom substrate allowing access and electrical contact to the IZO coating on the edges. Subsequent heating to approximately 100° C. annealed the layers together and the device was cooled to room temperature. While the device darkened completely in about 30 minutes, much of this darkening time comes from the high sheet resistance of the IZO coating.

Example 4

To a 1,2-propanediol:water (78:22) solution at 80° C. was added phenazine 1 and sulfonate viologen 1 so that the respective concentrations were 25 mM and 25 mM. The resulting solution was maintained at 80° C. and poly(vinyl alcohol) (87-89% hydrolyzed; MW 13,000 g/mol to 23,000 g/mol) was added an amount of 23% by weight. The resulting melt was poured onto an IZO-coated polycarbonate substrate, 200-220 micron glass beads were added, and another IZO-coated polycarbonate substrate placed on top of the melt. The top substrate was positioned with an offset to the bottom substrate allowing access and electrical contact to the IZO coating on the edges. Subsequent heating to approximately 100° C. annealed the layers together and the device was cooled to room temperature. The device was powered to 1.0 Volt and darkened to 5% transmittance after 5 minutes. The clear and dark transmission levels were 65% and 5%, respectively.

Example 5

To a 1,2-propanediol:water (78:22) solution (50.0 g) at 85° C. was added poly(vinyl alcohol) (15.0 g; 87-89% hydrolyzed; MW 13,000-23,000) in an amount to generate a solution with 23% by weight of the poly(vinyl alcohol). Phenazine 1, phenazine 2, and sulfonate viologen 1 were added so that the respective concentrations were 20 mM, 7 mM, and 27 mM. The resulting melt was poured onto a 5 inch by 5 inch ITO-coated glass substrate, 137 micron glass beads were added, and another a 5 inch by 5 inch ITO-coated glass substrate placed on top of the melt. The top substrate was positioned with an offset to the bottom substrate allowing access and electrical contact to the ITO coating on the edges. Subsequent heating to approximately 100° C. annealed the layers together and the device was cooled to room temperature. The color is much more neutral than Example 3. The device darkened noticeably after 15 seconds and completely after 2 minutes.

Example 6

To a 1,2-propanediol:water (78:22) solution (50.0 g) at 85° C. was added poly(vinyl alcohol) (15.0 g; 87-89% hydrolyzed; MW 13,000-23,000) in an amount to generate a solution with 23% by weight of the poly(vinyl alcohol). The following components were then added to generate the indicated final concentration:
Phenazine 3: 24 mM
Phenazine 2: 8 mM
Sulfonate viologen 1: 32 mM
Tetramethylhydroquinione: 2.5 mM
D-isoascorbic acid: 10 mM The hot melt was poured on to an IZO-coated polycarbonate substrate, 200 micron glass beads were added to the melt, and then another IZO-coated polycarbonate substrate was placed on top of the melt. The top substrate was positioned with an offset to the bottom substrate allowing access and electrical contact to the IZO coating on the edges. Annealing at 85 C and cooling to room temperature provided the device. The device exhibited a transmission range of 85% in the clear state to 6% in the darkened state and reaches full dark by 0.6 Volts. The steady state current is very low, at about 4 milliamps.

Examples with a Poly(Vinyl Formal)

Example 7

A melt was formed from propylene carbonate and the following components:
5,10-dineopentyl-5,10-dihydrophenazine: 22.5 mM
5,10-dineopentyl-2,7-(2-ethyl butyl) 5,10-dihydrophenazine: 3.25 mM
1,1'-(2-ethyl hexyl)-4,4'-dipyridinium bis tetrafluoroborate: 27.8 mM
Decamethyl ferrocene: 0.5 mM
Decamethyl ferrocinium: 1.0 mM
2-hydroxy-4-methoxy benzophenone: 85 mM
Poly(vinyl formal): 20% by weight
Remaining weight is propylene carbonate Upon formation of the melt, the melt was poured on to an ITO-coated 3 inch by 3 inch glass substrate. A few 75-90 micron glass beads were added to the melt as spacers and then the melt was covered with a second ITO-coated glass substrate. The top substrate was positioned with an offset to the bottom substrate allowing access and electrical contact to the ITO coating on the edges. A 1 pound weight was placed on top of the device and allowed to cool to room temperature overnight. Upon powering the resulting device at 1.2 V, the device was found to color well and fast and also clear nicely.

Example 8

A melt was formed from propylene carbonate and the following components:
5,10-dineopentyl-5,10-dihydrophenazine: 22.5 mM
5,10-dineopentyl-2,7-(2-ethyl butyl) 5,10-dihydrophenazine: 3.25 mM
1,1'-(2-ethyl hexyl)-4,4'-dipyridinium bis tetrafluoroborate: 27.8 mM
Decamethyl ferrocene: 0.5 mM
Decamethyl ferrocinium: 1.0 mM
2-hydroxy-4-methoxy benzophenone: 85 mM
Poly(vinyl formal): 20% by weight
Remaining weight is propylene carbonate Upon formation of the melt, the melt was poured on to an ITO-coated 3 inch by 3 inch glass substrate. A few 137 micron glass beads were added to the melt as spacers and then the melt was covered with a second ITO-coated glass substrate. The top substrate was positioned with an offset to the bottom substrate allowing access and electrical contact to the ITO coating on the edges. A 1 pound weight was placed on top of the device and allowed to cool to room temperature overnight to provide the device.

Example 9

A melt was formed from propylene carbonate and the following components:
5,10-dineopentyl-5,10-dihydro phenazine: 26.5 mM
5,10-dineopentyl-2,7-(2-ethyl butyl)-5,10-dihydro phenazine: 5.8 mM
1,1'-(2-ethyl hexyl)-4,4"-dipyridinium-bis-tetrafluoroborate: 34.8 mM
Decamethyl ferrocene: 1.0 mM
Decamethyl ferrocinium: 2.0 mM
Poly(vinyl formal): 25% by weight
Remaining weight is propylene carbonate This melt barely stirred at 85° C. Upon formation of the melt, the melt was poured on to an ITO-coated 3 inch by 3 inch glass substrate. A few 135 micron glass beads were added to the melt as spacers and then the melt was covered with a second ITO-coated glass substrate. The top substrate was positioned with an offset to the bottom substrate allowing access and electrical contact to the ITO coating on the edges. A 1 pound weight was placed on top of the device and allowed to cool to room temperature overnight to provide the device. The device functioned very well, coloring to a dark blue/gray color at 1.2 V and with little color in the clear state.

Example 10

A melt was formed from propylene carbonate at 85° C. and the following components:
5,10-dineopentyl-5,10-dihydro phenazine: 53.0 mM
5,10-dineopentyl-2,7-(2-ethyl butyl)-5,10-dihydro phenazine: 5.8 mM
5,10-dineopentyl-2,7-[(1-ol)-(2-ethyl) butyl]-5-10-dihydrophenazine: 5.8 mM
1,1'-(2-ethyl hexyl)-4,4'-dipyridinium-bis-tetrafluoroborate: 70.0 mM
Decamethyl ferrocene: 2.0 mM
Decamethyl ferrocinium: 2.0 mM
2-hydroxy-4-methoxy benzophenone: 85 mM
Poly(vinyl formal): 25% by weight
Remaining weight is propylene carbonate Upon formation of the melt, the melt was poured on to an ITO-coated 5 inch by 5 inch glass substrate. A few 200-220 micron glass beads were added to the melt as spacers, then the melt was covered with a second ITO-coated glass substrate. The top substrate was positioned with an offset to the bottom substrate allowing access and electrical contact to the ITO coating on the edges. This was then heated to around 85° C. and a 1 pound weight was placed on top of the device for 15 minutes, after which the device was allowed to cooled to room temperature. The device darkened at 1.2 V to a neutral blue/gray color that was so dark that it was not possible to see through it. La*b*Y measurements were taken in the full dark state and were as follows: L 0.05, a*−0.05, b*−0.15, Y−0.001. Thus, this device exhibited very low transmission levels of <0.1%.

Example 11

A melt was formed from propylene carbonate at 85° C. and the following components:
5,10-dineopentyl-5,10-dihydro phenazine: 26.5 mM
5,10-dineopentyl-2,7-(2-ethyl butyl)-5,10-dihydro phenazine: 5.8 mM
1,1'-(2-ethyl hexyl)-4,4"-dipyridinium-bis-tetrafluoroborate: 34.4 mM
Decamethyl ferrocene: 1.0 mM
Decamethyl ferrocinium: 1.0 mM
2-hydroxy-4-methoxy benzophenone: 85 mM
Poly(vinyl formal): 20% by weight
Remaining weight is propylene carbonate.

Example 12

A melt was formed same as in Example 11, with the addition of 2% by weight of dibutyl phthalate. The resulting thermoplastic had a lowered melting point of 55° C. and also exhibited a lowered temperature at which the thermoplastic can darken effectively (−18° C.). The resulting thermoplastic was also more elastic and less prone to tear. Such a device is suitable for automotive rearview mirrors and eyewear.

Example 13

A melt was formed from propylene carbonate and the following components at 90° C.:
5,10-dineopentyl-5,10-dihydro phenazine: 53.0 mM
5,10-dineopentyl-2,7-(2-ethyl butyl)-5,10-dihydro phenazine: 5.8 mM
5,10-dineopentyl-2,7-[(1-ol)-(2-ethyl) butyl]-5-10-dihydrophenazine: 5.8 mM
1,1'-(2-ethyl hexyl)-4,4''-dipyridinium-bis-tetrafluoroborate: 69.6 mM
Decamethyl ferrocene: 1.0 mM
Decamethyl ferrocinium: 1.0 mM
2-hydroxy-4-methoxy benzophenone: 85 mM
Poly(vinyl formal): 25% by weight
Remaining weight is propylene carbonate Upon formation of the melt, the melt was poured on to an ITO-coated 5 inch by 5 inch glass substrate. A few 137 micron glass beads were added to the melt as spacers, then the melt was covered with a second ITO-coated glass substrate (offset to the bottom substrate), heated to around 90° C. and a 1 pound weight was placed on top of the device for 15 minutes. The device was then allowed to cooled to room temperature. Upon cooling to room temperature, a seal of 23 wt % poly(vinyl alcohol)/77 wt % (78:22 1,2-propanediol:$H_2O$) at 85° C. was added around the periphery to seal the electrochromic thermoplastic from oxygen. Upon applying a voltage of 1.2V, the device darkened to a very dark blue/gray color.

Example 14

A thermoplastic melt was formed from propylene carbonate and the following components at 90° C.:
5,10-dineopentyl-5,10-dihydro phenazine: 26.5 mM
5,10-dineopentyl-2,7-(2-ethyl butyl)-5,10-dihydro phenazine: 5.8 mM
1,1'-(2-ethyl hexyl)-4,4''-dipyridinium-bis-tetrafluoroborate: 34.8 mM
Decamethyl ferrocene: 1.0 mM
Decamethyl ferrocinium: 1.0 mM
Poly(vinyl formal): 25% by weight
The remainder was propylene carbonate The hot melt was then poured on to parchment paper. 500 micron glass beads were added as spacers and the hot melt covered with another sheet of parchment paper. The thermoplastic melt was then rolled out, as it cooled, with a rolling pin and subsequently re-heated to 75° C. and again rolled out with a rolling pin to provide an evenly distributed 500 micron spacing thermoplastic sheet. Once cooled, the parchment paper was removed from one side of the thermoplastic placed on an ITO-coated glass substrate. Upon cooling the combination to 5° C., the parchment paper on the other side of the thermoplastic was removed and covered with a second ITO-coated glass substrate. The top substrate was positioned with an offset to the bottom substrate allowing access and electrical contact to the ITO coating on the edges. The thermoplastic was annealed to the ITO-coated glass substrates by placing a 1 pound weight on top of the device and heating to at 75° C. for 30 minutes. The device was then cooled and a seal of 23 wt % poly(vinyl alcohol)/77 wt % (78:22 1,2-propanediol:$H_2O$) at 85° C. was added around the periphery to seal the electrochromic thermoplastic from oxygen.

Example 15: An Electrochromic Thermoplastic Composite

A 3 inch by 3 inch, 3 layer device was constructed as follows. A thermoplastic melt was formed from propylene carbonate and the following components at 90° C.:
5,10-dineopentyl-5,10-dihydro phenazine: 26.5 mM
5,10-dineopentyl-2,7-(2-ethyl butyl)-5,10-dihydro phenazine: 5.8 mM
1,1'-(2-ethyl hexyl)-4,4''-dipyridinium-bis-tetrafluoroborate: 34.8 mM
Decamethyl ferrocene: 1.0 mM
Decamethyl ferrocinium: 1.0 mM
Poly(vinyl formal): 25% by weight
Remaining weight is propylene carbonate The hot melt was then poured on to parchment paper. 500 micron glass beads were added as spacers and the hot melt covered with another sheet of parchment paper. The thermoplastic melt was then rolled out, as it cooled, with a rolling pin and subsequently re-heated to 75° C. and again rolled out with a rolling pin to provide an evenly distributed 500 micron spacing thermoplastic sheet. Once cooled, the thermoplastic sheet was then cut into two 3 inch by 3 inch electrochromic pieces. The parchment paper was removed from one side of each electrochromic piece and the free sides each placed on separate ITO-coated glass substrates. A 500 micron thermoplastic sheet of 25 wt % poly(vinyl formal) in propylene carbonate and 0.1 M tetraethylammonium tetrafluoroborate was prepared in a similar manner as described above and, after removal of the parchment paper on each side of the sheet, was placed between the electrochromic pieces. The 3 layer device was annealed by placing a 1 pound weight on top of the device and heating to 75° C. for 30 minutes, followed by cooling to room temperature. The device was then powered for 5 minutes at 1.2 Volts. The device went very dark during this time and, after 2 hours off current was still quite dark. Without being bound by theory, this result indicates that the cathodic and anodic cation radicals in the device were being held separate in their own thermoplastic layers.

Example 16

A thermoplastic melt was formed from propylene carbonate and the following components at 105° C.:
5,10-dineopentyl-5,10-dihydro phenazine: 8.2 mM
5,10-dineopentyl-2,7-(2-ethyl butyl)-5,10-dihydro phenazine: 2.8 mM
1,1'-(2-ethyl hexyl)-4,4''-dipyridinium-bis-tetrafluoroborate: 11.6 mM
Decamethyl ferrocene: 1.0 mM
Decamethyl ferrocinium: 1.0 mM
2-hydroxy-4-methoxy benzophenone: 85 mM
Poly(vinyl formal): 25% by weight
Dibutyl phthalate: 4% by weight
Remaining weight is propylene carbonate The hot melt was then poured on to a sheet of parchment paper and covered with another sheet of parchment paper. A metal roller system with 2 metal rollers separated by a space, where the space may be manipulated and dialed in with micrometers, was set to a thickness of 700 microns. The hot melt sandwiched between the sheets of parchment paper was then directed through the metal roller system to obtain a thermoplastic sheet with about a 700 micron cell spacing.

Example 17

A thermoplastic melt was formed from propylene carbonate and the following components at 105° C.:
5,10-dineopentyl-5,10-dihydro phenazine: 8.2 mM
5,10-dineopentyl-2,7-(2-ethyl butyl)-5,10-dihydro phenazine: 2.8 mM
1,1'-(2-ethyl hexyl)-4,4"-dipyridinium-bis-tetrafluoroborate: 11.6 mM
Decamethyl ferrocene: 1.0 mM
Decamethyl ferrocinium: 1.0 mM
2-hydroxy-4-methoxy benzophenone: 85 mM
Poly(vinyl formal): 25% by weight
Dibutyl phthalate: 4% by weight
Remaining weight is propylene carbonate A syringe was heated to 120° C. and the thermoplastic melt was charged to the syringe. The syringe was then used to pressure fill a number of windows with an inlet and outlet and a cell spacing of 500 microns.

Example 18

A thermoplastic melt was formed from propylene carbonate and the following components at 105° C.:
5,10-dineopentyl-5,10-dihydro phenazine: 53.0 mM
5,10-dineopentyl-2,7-(2-ethyl butyl)-5,10-dihydro phenazine: 5.8 mM
5,10-dineopentyl-2,7-(isobutyl)-5-10-dihydrophenazine: 5.8 mM
1,1'-(2-ethyl hexyl)-4,4"-dipyridinium-bis-tetrafluoroborate: 69.3 mM
Decamethyl ferrocene: 1.0 mM
Decamethyl ferrocinium: 1.0 mM
2-hydroxy-4-methoxy benzophenone: 170 mM
Poly(vinyl formal): 25% by weight
Remaining weight is propylene carbonate A syringe was heated to 120° C. and the thermoplastic melt was charged to the syringe. Two cells were formed, each consisting of two approximately 5 centimeter ("cm") by 13 cm ITO-coated glass substrates, one of which was provided with two holes. In one cell the inward facing ITO-coated glass substrates were spaced apart by 500 micron spacers around the perimeter of the window ("18A") and in the other the spacers were 90 microns ("18B"). The windows were then pressure filled with the thermoplastic melt, the fill holes were sealed, and the device allowed to cool to room temperature.

Figure 2:
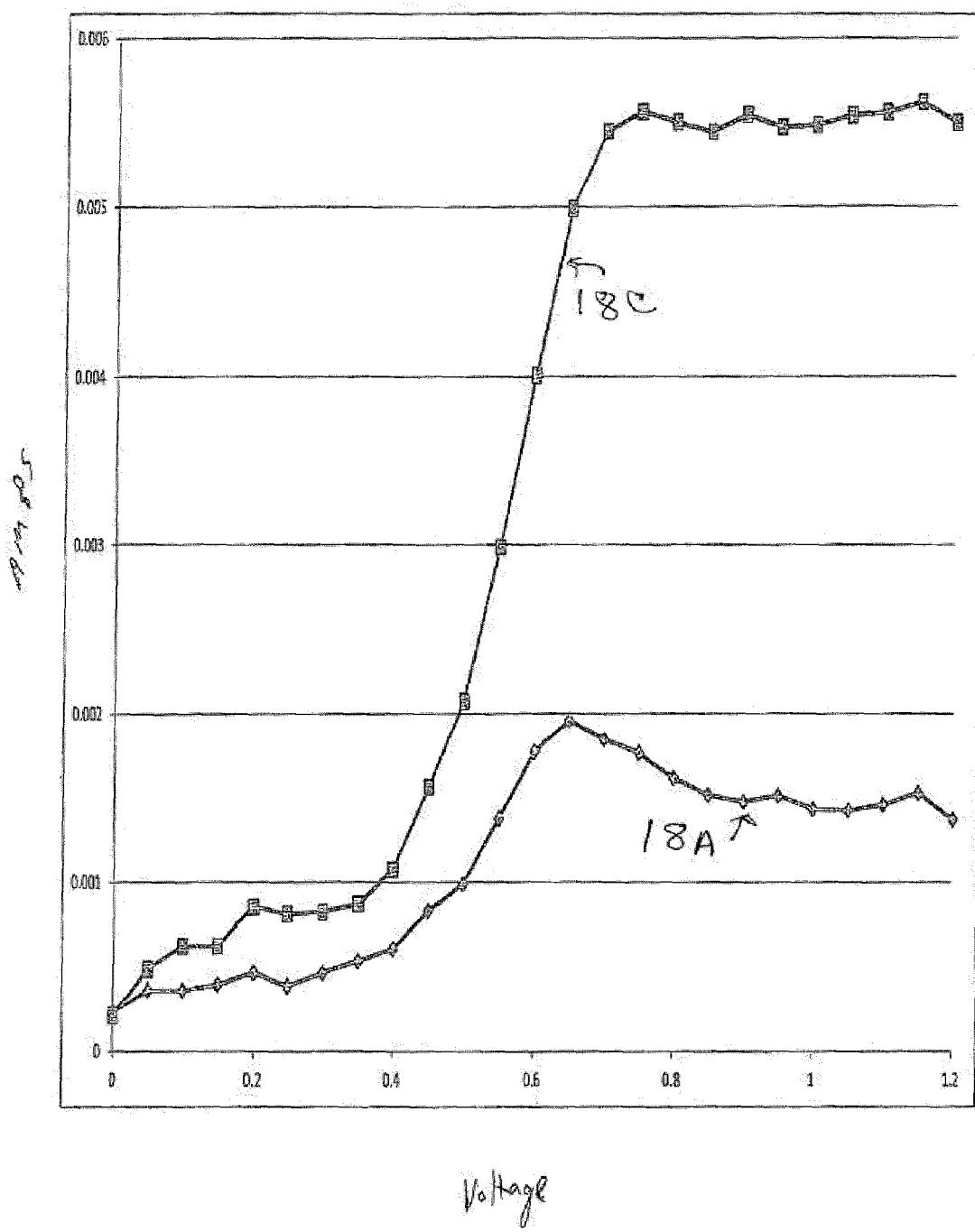
FIG. 2 presents the currents with applied voltages of a 500 micron thick electrochromic thermoplastic window of the present technology in comparison with a polyurethane gel window of the same thickness, according to the working examples.
Figure 3:
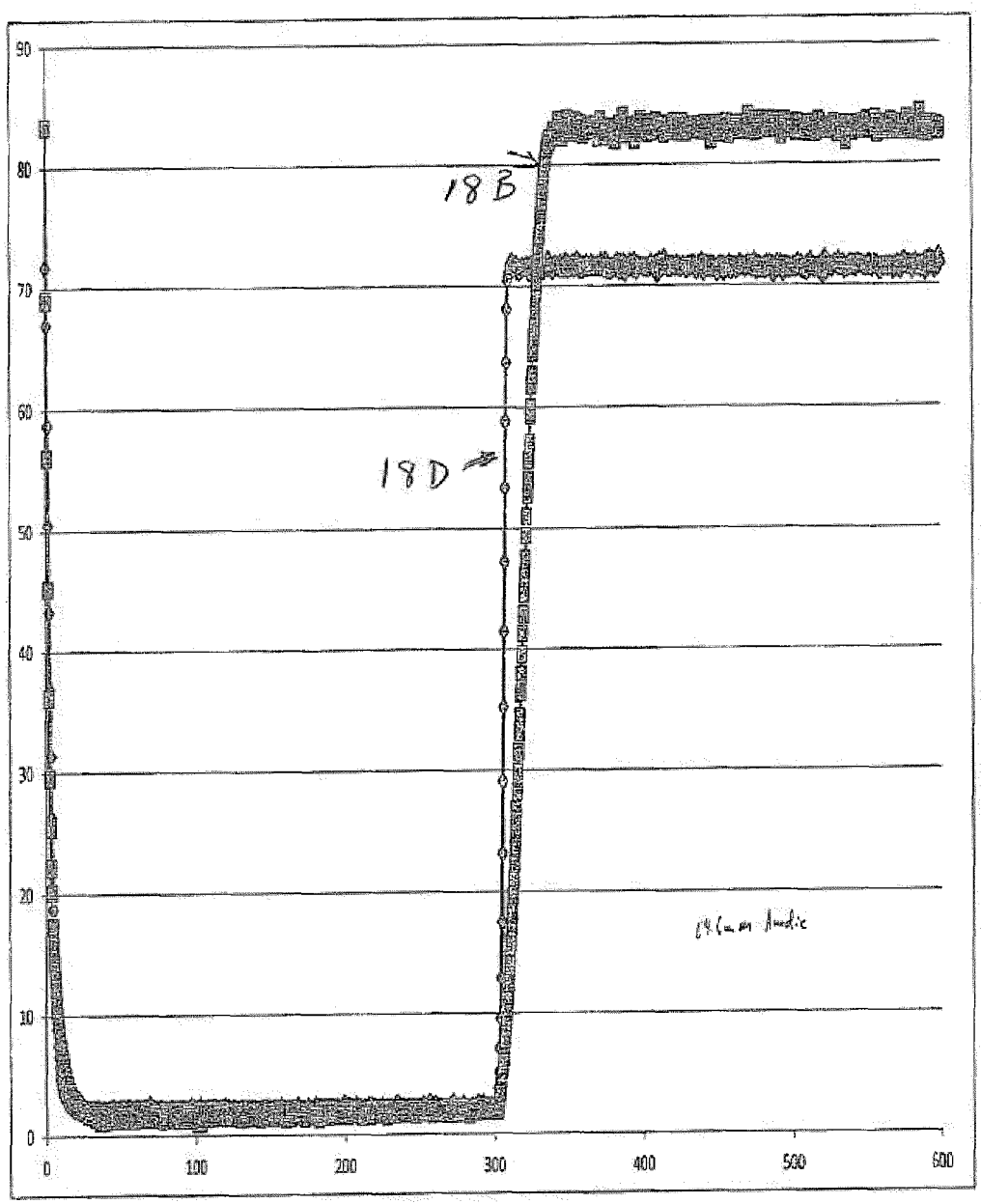
FIG. 3 presents the coloring and clearing speeds of a 90 micron thick electrochromic thermoplastic window of the present technology in comparison with a polyurethane gel window of the same thickness where the y-axis is percent transmission and the x-axis is time in units of seconds, according to the working examples.
Figure 4:
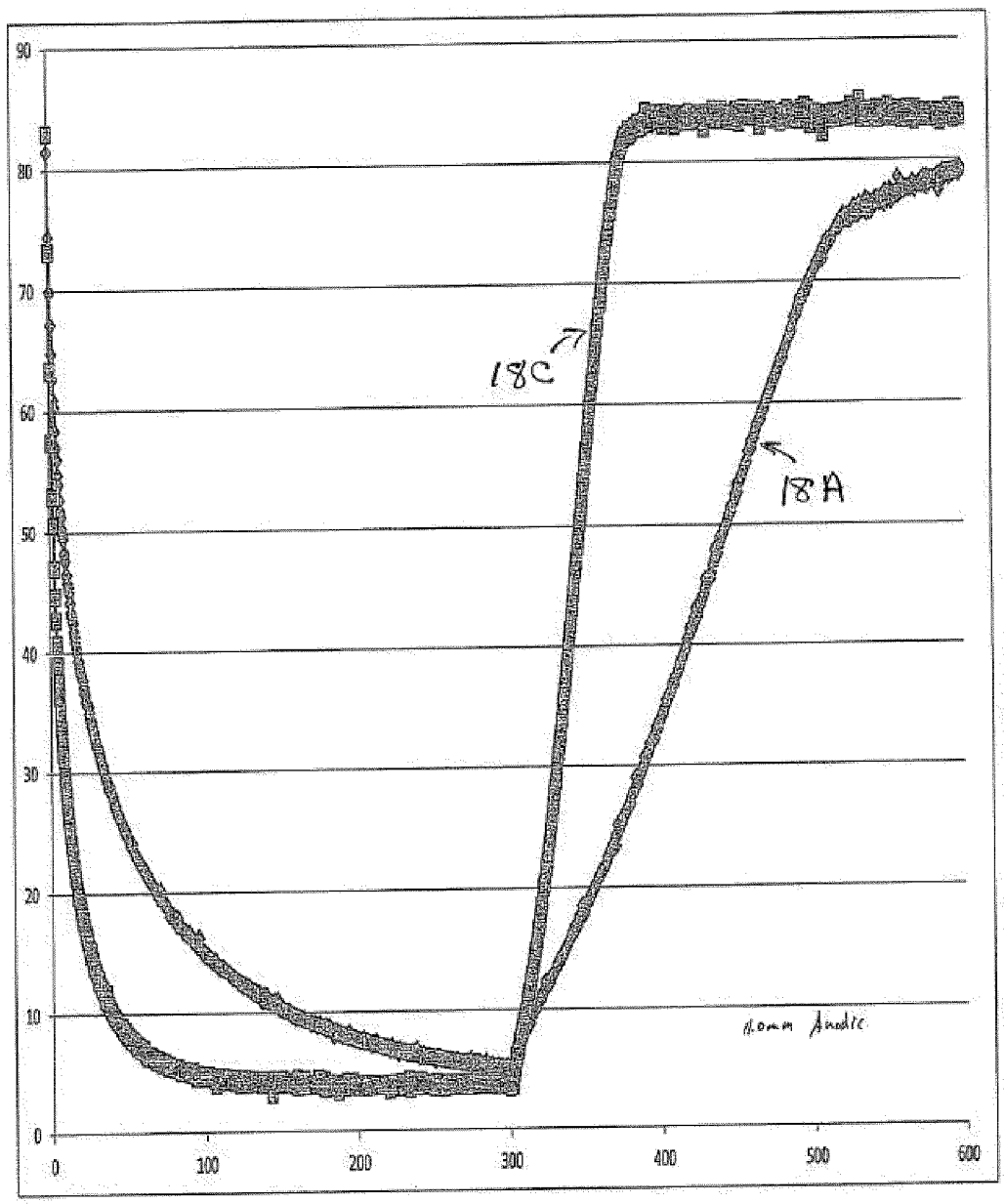
FIG. 4 presents the coloring and clearing speeds of a 500 micron thick electrochromic thermoplastic window of the present technology in comparison with a polyurethane gel window of the same thickness where the y-axis is percent transmission and the x-axis is time in units of seconds, according to the working examples.

These windows were compared to identically constructed cells made with the same concentration of all the components listed above with the exception of a polyurethane gel (5.5 wt % with 0.375 wt % MDI cross-linker as disclosed U.S. Pat. No. 6,635,194 incorporated herein by reference in its entirety for any and all purposes) instead of the poly(vinyl formal) to provide a comparative 500 micron window ("18C") and a comparative 90 micron window ("18D"). All the cell were tested by adjusting the applied potential and measuring the resulting current. The comparison of currents (Amps) vs. applied potential (volts) is shown in FIGS. 1 & 2. The cells were also tested by the application of 1.2V for 300 seconds followed by shorting of the two ITO substrates where the coloring and clearing timing is shown in FIGS. 3 & 4. In FIGS. 3 & 4, the y-axis is percent transmission, and the x-axis is time in units of seconds. The currents for both the 90 micron thermoplastic cell (FIG. 1) and the 500 micron thermoplastic cell (FIG. 2) were much lower than for the comparable polyurethane devices. Furthermore, as illustrated by FIG. 3, the coloring speed and clearing speed for the 90 micron thermoplastic of the present technology was similar as exhibited by the 90 micron polyurethane gel.

Examples with Poly(Methyl Methacrylate)

Example 19

A thermoplastic melt was formed at 125° C. with poly (methyl methacrylate) ("PMMA"; MW ~350,000) and to it was added enough propylene carbonate so that, weight after the remaining components listed below were added, the PMMA was 20% by weight of the thermoplastic melt. After complete dissolution, this initial melt was cooled to 105° C. and to it was added the components below in the amount necessary to provide the concentrations indicated.
5,10-dineopentyl-5,10-dihydro phenazine: 53.0 mM
5,10-dineopentyl-2,7-(2-ethyl butyl)-5,10-dihydro phenazine: 5.8 mM
5,10-dineopentyl-2,7-(isobutyl)-5-10-dihydrophenazine: 5.8 mM
1,1'-(2-ethyl hexyl)-4,4"-dipyridinium-bis-tetrafluoroborate: 69.6 mM
Decamethyl ferrocene: 1.0 mM
Decamethyl ferrocinium: 1.0 mM
2-hydroxy-4-methoxy benzophenone: 85 mM
Tinuvin pentyl ester: 30 mM
Dibutyl phthalate: 5% by weight
Poly(methyl methacrylate): 20% by weight
Remaining weight is propylene carbonate A 340 micron thick thermoplastic sheet and a 540 micron thick thermoplastic sheet were then formed via the metal roller system described above with the exception that a polyester release liner (3M part No. 4935) was used instead of parchment paper. After cooling and removal of the release liners, it was observed that the thermoplastic sheets have little color in the unpowered clear state.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, reagents, compounds, compositions, labeled compounds or biological systems, which can, of course, vary. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. An electrochromic thermoplastic composition comprising:
   about 10 wt % to about 60 wt % of a poly(vinyl alcohol), a poly(acrylic acid), a poly(acrylic acid) salt, a polyaniline salt, a poly(diallyl dimethyl ammonium chloride), a poly(ethylene-co-acrylic acid), a co-polymer of any two or more thereof, or a mixture of any two or more thereof;
   about 10 wt % to about 90 wt % water as a first protic solvent;
   a second protic solvent comprising an alcohol, a carboxylic acid, a primary amino compound, a secondary amino compound, or a mixture of any two or more thereof, wherein a total amount of protic solvent in the composition is about 40 wt % to about 90 wt %; and
   at least one electroactive material;
   wherein the composition is void of lithium chloride, tetrabutylammonium bromide, lithium bis(trifluoromethanesulfonyl)imide, lithium triflate, and lithium hexafluorophosphate.

2. The electrochromic thermoplastic composition of claim 1 comprising about 10 wt % to about 60 wt % poly(vinyl alcohol).

3. The electrochromic thermoplastic composition of claim 1, wherein the at least one electroactive material comprises a viologen represented by Formula (I):

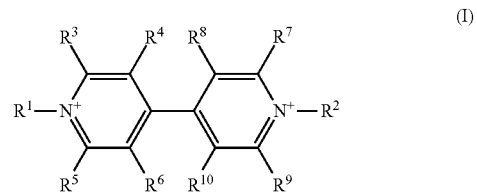

wherein:
   $R^1$ and $R^2$ are each independently an alkyl group substituted with a carboxylate, phosphonate, phosphate, or sulfonate;
   $R^3$, $R^4$, $R^5$, $R^6$, $R^7$, $R^8$, $R^9$, and $R^{10}$ are each independently H, $OR^{11}$, F, Cl, Br, I, CN, $NO_2$, alkyl, or aryl; and
   $R^{11}$ is H or alkyl.

4. The electrochromic thermoplastic composition of claim 1, wherein the at least one electroactive material comprises an anodic material comprising a compound represented by Formula (II)

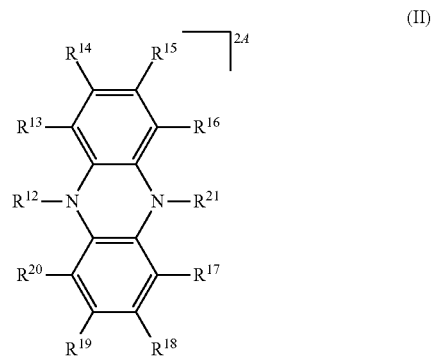

wherein:
   $R^{12}$ and $R^{21}$ are each independently an alkyl group substituted with a carboxylate, phosphonate, phosphate, or sulfonate;
   $R^{13}$, $R^{14}$, $R^{15}$, $R^{16}$, $R^{17}$, $R^{18}$, $R^{19}$, and $R^{20}$ are each independently H, F, Cl, Br, I, CN, $OR^{22}$, $SR^{22}$, $NO_2$, alkyl, aryl, or amino, or any two adjacent $R^{13}$, $R^{14}$, $R^{15}$, $R^{16}$, $R^{17}$, $R^{18}$, $R^{19}$, and $R^{20}$ join to form a monocyclic, polycyclic, or heterocyclic group;
   each $R^{22}$ is independently at each occurrence H or alkyl; and
   A is a cation.

5. The electrochromic thermoplastic composition of claim 4 which comprises at least two different compounds represented by Formula (II).

6. The electrochromic thermoplastic composition of claim 1, wherein the composition comprises at least one cathodic material and at least one anodic material.

7. An electrochromic composite comprising:
   a first electrochromic thermoplastic composition of claim 1 comprising a cathodic material, a front surface, and a rear surface;
   a second electrochromic thermoplastic composition of claim 1 comprising an anodic material, a front surface, and a rear surface;

a layer comprising:
about 10 wt % to about 60 wt % poly(vinyl alcohol);
about 40 wt % to about 90 wt % of a solvent comprising a protic solvent;
a front surface; and
a rear surface;
wherein
the front surface of the layer is annealed to the rear surface of the first electrochromic thermoplastic composition; and
the rear surface of the layer is annealed to the front surface of the second electrochromic thermoplastic composition.

8. The electrochromic composite of claim 7, wherein the layer further comprises an electrolyte salt.

9. An electrochromic device comprising
the electrochromic composite of claim 7;
a first substrate with a first conductive surface; and
a second substrate with a second conductive surface;
wherein the first conductive surface is annealed to the front surface of the electrochromic thermoplastic composition and the second conductive surface is annealed to the rear surface of the electrochromic thermoplastic composition.

10. An electrochromic device comprising
the electrochromic thermoplastic composition of claim 1 comprising a front surface and a rear surface;
a first substrate with a first conductive surface; and
a second substrate with a second conductive surface;
wherein the first conductive surface is annealed to the front surface of the electrochromic thermoplastic composition and the second conductive surface is annealed to the rear surface of the electrochromic thermoplastic composition.

11. An electrochromic thermoplastic composition comprising
about 10 wt % to about 60 wt % poly(vinyl alcohol);
about 10 wt % to about 90 wt % water as a first protic solvent;
a second protic solvent comprising an alcohol, a carboxylic acid, a primary amino compound, a secondary amino compound, or a mixture of any two or more thereof, wherein a total amount of protic solvent in the composition is about 40 wt % to about 90 wt %; and
at least one electroactive material;
wherein the composition is void of lithium chloride, tetrabutylammonium bromide, lithium bis(trifluoromethanesulfonyl)imide, lithium triflate, and lithium hexafluorophosphate.

12. The electrochromic thermoplastic composition of claim 11, wherein the at least one electroactive material comprises a viologen represented by Formula (I):

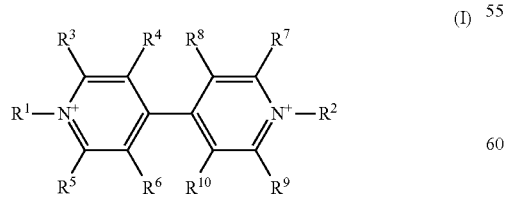

wherein:
$R^1$ and $R^2$ are each independently an alkyl group substituted with a carboxylate, phosphonate, phosphate, or sulfonate;
$R^3$, $R^4$, $R^5$, $R^6$, $R^7$, $R^8$, $R^9$, and $R^{10}$ are each independently H, $OR^{11}$, F, Cl, Br, I, CN, $NO_2$, alkyl, or aryl; and
$R^{11}$ is independently at each occurrence H or alkyl.

13. The electrochromic thermoplastic composition of claim 11, wherein the at least one electroactive material comprises an anodic material represented by Formula (II):

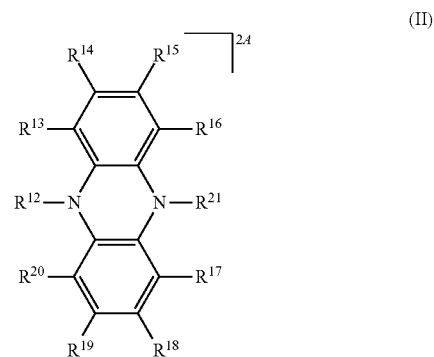

wherein:
$R^{12}$ and $R^{21}$ are each independently an alkyl group substituted with a carboxylate, phosphonate, phosphate, or sulfonate;
$R^{13}$, $R^{14}$, $R^{15}$, $R^{16}$, $R^{17}$, $R^{18}$, $R^{19}$, and $R^{20}$ are each independently H, F, Cl, Br, I, CN, $OR^{22}$, $SR^{22}$, $NO_2$, alkyl, aryl, or amino, or any two adjacent $R^{13}$, $R^{14}$, $R^{15}$, $R^{16}$, $R^{17}$, $R^{18}$, $R^{19}$, and $R^{20}$ join to form a monocyclic, polycyclic, or heterocyclic group;
each $R^{22}$ is independently at each occurrence H or alkyl; and
A is a cation.

14. An electrochromic composite comprising:
a first electrochromic thermoplastic composition of claim 11 comprising a cathodic material, a front surface, and a rear surface;
a second electrochromic thermoplastic composition of claim 11 comprising an anodic material, a front surface, and a rear surface;
a layer comprising:
about 10 wt % to about 60 wt % poly(vinyl alcohol);
about 40 wt % to about 90 wt % of a solvent comprising a protic solvent;
a front surface; and
a rear surface;
wherein
the front surface of the layer is annealed to the rear surface of the first electrochromic thermoplastic composition; and
the rear surface of the layer is annealed to the front surface of the second electrochromic thermoplastic composition.

15. The electrochromic composite of claim 14, wherein the layer further comprises an electrolyte salt.

16. An electrochromic device comprising
the electrochromic thermoplastic composition of claim 11 comprising a front surface and a rear surface;
a first substrate with a first conductive surface; and
a second substrate with a second conductive surface;
wherein the first conductive surface is annealed to the front surface of the electrochromic thermoplastic composition and the second conductive surface is annealed to the rear surface of the electrochromic thermoplastic composition.

\* \* \* \* \*